US012072902B2

(12) United States Patent
Srinivasan et al.

(10) Patent No.: US 12,072,902 B2
(45) Date of Patent: Aug. 27, 2024

(54) MULTIFACETED SEARCH WITH FACET HIERARCHY

(71) Applicant: Open Text Corporation, Waterloo (CA)

(72) Inventors: Preetha Srinivasan, Bengaluru (IN); Brian J. Jenks, Atlanta, GA (US)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

(21) Appl. No.: 18/339,602

(22) Filed: Jun. 22, 2023

(65) Prior Publication Data

US 2023/0350907 A1   Nov. 2, 2023

Related U.S. Application Data

(63) Continuation of application No. 17/407,032, filed on Aug. 19, 2021, now Pat. No. 11,727,024, which is a continuation of application No. 16/230,763, filed on Dec. 21, 2018, now Pat. No. 11,126,633.

(51) Int. Cl.
| | |
|---|---|
| *G06F 16/00* | (2019.01) |
| *G06F 9/451* | (2018.01) |
| *G06F 16/22* | (2019.01) |
| *G06F 16/23* | (2019.01) |
| *G06F 16/242* | (2019.01) |
| *G06F 16/248* | (2019.01) |

(52) U.S. Cl.
CPC ............ *G06F 16/248* (2019.01); *G06F 9/451* (2018.02); *G06F 16/2246* (2019.01); *G06F 16/2379* (2019.01); *G06F 16/2428* (2019.01)

(58) Field of Classification Search
CPC ..................................................... G06F 16/248
USPC ....................................................... 707/722
See application file for complete search history.

(56) References Cited

U.S. PATENT DOCUMENTS

| | | | | |
|---|---|---|---|---|
| 2008/0243778 A1* | 10/2008 | Behnen | ................. | G06F 16/248 707/707 |
| 2011/0078136 A1* | 3/2011 | Ronen | .................... | G06F 16/951 707/707 |
| 2012/0192115 A1* | 7/2012 | Falchuk | .............. | G06F 3/04883 715/850 |

* cited by examiner

*Primary Examiner* — Alexandria Y Bromell
(74) *Attorney, Agent, or Firm* — Sprinkle IP Law Group

(57) ABSTRACT

A method for faceted search comprises generating a search user interface comprising a facet hierarchy interface configured to display a representation of a facet hierarchy in conjunction with results displayed in a search results display, updating the search results display to display faceted search results and updating the facet hierarchy interface to display, in conjunction with the faceted search results displayed in the updated search results display, a control to allow a user to select a search facet topic where the search facet topic is a facet topic from the facet hierarchy that is not represented in the faceted search results.

20 Claims, 25 Drawing Sheets

| | Search: | business | | 504 |

Search Results for: business
504 Items
Refine by: 502

Format ∧
- PDF (454)
- Rich Text Format (RTF) (42)
- Word Document (7)
- C2 PDF Rendition (1)

Authors ∧
- hr_contributor2 (121)
- jim (111)
- brian (44)
- kristin (44)
- hr_contributor1 (33)
- show more...

Zone ∧
- North America (252)
- Europe and Middle East (167)
- South America (50)
- Africa (14)
- Asia Pacific (1)

☐ HR_2018_num_167 — Name: HR_2018_num_167 / Status: Draft / Creator: kristen

☐ Test — Name: Test / Creator: brian / Owner: brian

☐ Product-Overview-1 — Name: Product-Overview-1 / Creator: brian / Owner: brian

☐ Product-Overview-2 — Name: Product-Overview-2 / Creator: brian / Owner: brian

☐ HR_2018_num_559 — Name: HR_2018_num_559 / Status: In Review / Creator: Administrator 504 Items   10 per page   | 1 | 2 | 3 | 4 | 5 | 6 | 7 | 8 | 9 | 10 | 11 | 12 | >

Search Results for: business

Refine by:

Format
- [X] WORD Document
  - Modified
    - [ ] This Year
    - [ ] Last Month
- [ ] PDF
- [ ] Rich Text Format (RTF)
- [ ] C2 PDF Rendition

Authors
- [ ] Administrator

Zone
- [X] Asia Pacific
  - Country
    - [ ] India
- [ ] North America
- [ ] Europe and Middle East
- [ ] South America
- [ ] Africa Search: business Zone: Asia Pacific ✕   Format: Word Document ✕

HR_2018_num_559

Name: HR_2018_num_559
Status: In Review
Creator: Administrator

1 Item

Search Results for: business

Refine by:

Search: business

Zone: ☒ North America ✗ Europe and Middle East ✗

Zone

☒ North America (252)
  Country
  810 ☐ United States (200)
      ☐ Canada (50)
      ☐ Mexico (2)

☒ Europe and Middle East (167)
  Country
  ☐ Germany (100)
  ☐ UAE (67)

☐ Asia Pacific
☐ Africa
☐ South America

---

☐ 📄 HR_2018_num_167
   Name: HR_2018_num_167
   Status: Draft
   Creator: kristen ☐ 📄 Test
   Name: Test
   Creator: brian
   Owner: brian ☐ 📄 Product-Overview-1
   Name: Product-Overview-1
   Creator: brian
   Owner: brian ☐ 📄 Product-Overview-2
   Name: Product-Overview-2
   Creator: brian
   Owner: brian ☐ 📄 HR_2018_num_800
   Name: HR_2018_num_559
   Status: Draft
   Creator: hr_contributor1

419 Items   10 per page   1  2  3  4  5  6  7  8  9  10  11  12

Search Results for: business

Search: business

Refine by: 902

Zone
- ☒ North America
  - Country
    - ☒ United States (252)
      - City
        - ☐ Chicago (200)
        - ☐ New York (100)
    - ☐ Canada (100)
    - ☐ Mexico (167)
- ☒ Europe and Middle East
  - Country
    - ☐ Germany (100)
    - ☐ UAE (67)
- ☐ Asia Pacific
- ☐ Africa
- ☐ South America Zone: North America ✗   Europe and Middle East ✗

904

☐ HR_2018_num_167 — Name: HR_2018_num_167  Status: Draft  Creator: kristen

☐ Test — Name: Test  Creator: brian  Owner: brian

☐ Product-Overview-1 — Name: Product-Overview-1  Creator: brian  Owner: brian

☐ Product-Overview-2 — Name: Product-Overview-2  Creator: brian  Owner: brian

☐ HR_2018_num_800 — Name: HR_2018_num_559  Status: Draft  Creator: Hr_contributor1

367 Items  10 per page   1 2 3 4 5 6 7 8 9 10 11 12

Refine by: 1002

Author ∧
- [X] Jim — 82
  - Type
    - 1020 — [X] Policy — 82
    - Status
      - [ ] Draft
      - [ ] Approved
- [X] Brian
  - Type
    - [ ] Policy
    - 1022 — [X] Directive
  - Status
    - [ ] Draft
    - [ ] In-Review

Zone ∧
- [X] North America — 32
  - Country
    - 1024 — [X] United States — 32
    - City
      - [ ] Chicago — 20
      - [ ] New York — 12
  - [ ] Canada
  - [ ] Mexico
- [X] Europe and Middle East — 8
  - Country
    - 1028 — [X] Germany — 8
    - City
      - [ ] Berlin — 8
  - [ ] UAE
- [ ] Asia Pacific
- [ ] Africa
- [ ] South America 1004
- Type: Directive ✗  Type: Policy ✗
- Zone: North America ✗  Europe and Middle East ✗

- [ ] HR_2018_num_1017
- [ ] HR_2018_num_1018
- [ ] HR_2018_num_1019
- [ ] HR_2018_num_1020
- [ ] HR_2018_num_1021
- [ ] HR_2018_num_1022
- [ ] HR_2018_num_1023
- [ ] HR_2018_num_1024
- [ ] HR_2018_num_1025

MULTIFACETED SEARCH WITH FACET HIERARCHY

CROSS REFERENCE TO OTHER APPLICATIONS

This application is a continuation of, and claims a benefit of priority under 35 U.S.C. 120 from, U.S. patent application Ser. No. 17/407,032, filed Aug. 19, 2021, issued as U.S. Pat. No. 11,727,024, entitled "MULTIFACETED SEARCH WITH FACET HIERARCHY," which is a continuation of, and claims a benefit of priority under 35 U.S.C. 120 from, U.S. patent application Ser. No. 16/230,763, filed Dec. 21, 2018, issued as U.S. Pat. No. 11,126,633, entitled "MULTIFACETED SEARCH WITH FACET HIERARCHY," both of which are fully incorporated herein by reference for all purposes.

TECHNICAL FIELD

The present disclosure relates generally to searching digital information. More particularly, the present disclosure relates to faceted search. Even more specifically, the present disclosure relates to multifaceted search.

BACKGROUND

Faceted search is a feature of search applications that enhances user experience by allowing users to explore search results based on faceted classification of objects represented in a search result. Generally speaking, facets are independent attributes (explicit dimensions) by which objects in a searchable collection can be classified. Facets typically correspond to properties of the objects in the searchable collection.

In a typical faceted search, a user submits a full-text or other initial search request and the search application returns the search results for the query along with a set of facets and associated facet values (also referred to as facet topics) that organize the results into a multidimensional information space. The user can then select a facet value to update the navigational context. The search application returns the results based on the navigational context and the facets and associated facet values for the results corresponding to the current navigational context.

The facets offer navigational refinement on the search results because the facets allow a user to drill-down into search results. The selection of a facet value associated with a search result for a current navigational context typically generates a faceted query that includes the facet value constraints and narrows the context of the query for which the search result was provided—that is, narrows the navigational context. As such, the search results for a faceted query contain only those results associated with the facet value and are a subset of the search results returned for the prior navigational context.

Prior faceted search systems have a number of limitations. As one shortcoming, faceted search interfaces typically only display currently available facet values—that is, the facet values represented by the current search results from the last query. Put another way, such faceted search interfaces only display facet values associated with the search results for the current navigational context. This means that to select a desired facet value represented in a broader set of search results, but not represented in a current set of filtered search results, the user must back out of the facet value selections to return to a prior navigational context for which the desired facet value was displayed.

As another shortcoming, many faceted search systems are not truly multifaceted. While some search interfaces give the appearance of being multifaceted, many such search interfaces generate a query each time a facet topic is selected or deselected. Moreover, many search systems do not support complex queries across facets.

SUMMARY

One embodiment includes a multifaceted search system comprising a memory configured with a facet configuration, the facet configuration comprising a facet hierarchy definition. The system further comprises a processor coupled to the memory and non-transitory computer readable medium storing a set of instructions executable by the processor. The set of instructions may comprise instructions executable to determine a facet hierarchy for a set of search results from a first search. The facet hierarchy is determined according to the facet hierarchy definition and comprises a plurality of facet topics represented by the set of search results.

The instructions are further executable to provide a search user interface. The search user interface, according to one embodiment, comprises a search results display to display results from the set of search results and a facet interface to display facets in conjunction with the results. More particularly, in some embodiments, the facet interface may be a facet hierarchy interface that displays a representation of the facet hierarchy in conjunction with the results from the set of results. The facet hierarchy interface can comprise controls to allow a user to multi-select facet topics from the plurality of facet topics.

The instructions may further comprise instructions executable to provide a search user interface. The search user interface may be configured to receive a user input, the user input comprising a facet topic selection including an indication of a facet topic selected from the facet hierarchy interface, and generate a faceted query based on the facet topic selection.

The instructions may further comprise instructions executable to update the search results display to display faceted search results, wherein the faceted search results comprise a subset of the set of search results from the first search that match the faceted query.

The instructions may further comprise instructions executable to update the facet hierarchy interface to display, in conjunction with the faceted search results, a control to allow a user to select a search facet topic, wherein the search facet topic is a facet topic from the facet hierarchy that is not represented in the faceted search results.

Another embodiment includes a multifaceted search method that comprises receiving a set of search results for a first search and determining a facet hierarchy for the set of search results according to a facet hierarchy definition. The facet hierarchy can comprise a plurality of facet topics represented by the set of search results.

The method can further comprise generating a search user interface. The search user interface can comprise a search results display to display results from the set of search results and a facet hierarchy interface to display a representation of the facet hierarchy in conjunction with the results from the set of results. The facet hierarchy interface can comprise controls to allow a user to multi-select facet topics from the plurality of facet topics.

The method can further include receiving a user input comprising a facet topic selection that includes an indication of a facet topic selected from the facet hierarchy interface and generating a faceted query based on the facet topic selection.

The method can further include updating the search results display to display faceted search results, where the faceted search results comprise the subset of the set of search results from the first search that match the faceted query.

The method can comprise updating the facet hierarchy interface. The updated facet hierarchy can be configured to display, in conjunction with the faceted search results, a control to allow a user to select a search facet topic, where the search facet topic is a facet topic from the facet hierarchy that is not represented in the faceted search results.

Another embodiment comprises a computer program product for a multifaceted search system, the computer program product comprising a non-transitory computer readable medium storing a set of instructions executable by a processor. The set of instructions can comprise instructions executable to: access a facet hierarchy definition; determine a facet hierarchy for a set of search results from a first search, the facet hierarchy determined according to the facet hierarchy definition and comprising a plurality of facet topics represented by the set of search results; and generate a search user interface comprising a search results display to display results from the set of search results and a facet hierarchy interface to display a representation of the facet hierarchy in conjunction with the results from the set of results. The facet hierarchy interface can comprise controls to allow a user to multi-select facet topics from the plurality of facet topics.

According to one embodiment, the search user interface can be configured to receive a user input comprising a facet topic selection, the facet topic selection including an indication of a facet topic selected from the facet hierarchy interface and generate a faceted query based on the facet topic selection.

According to one embodiment, the set of computer instructions may further comprise instructions executable to: update the search results display to display faceted search results, where the faceted search results comprise a subset of the set of search results from the first search that match the faceted query; and update the facet hierarchy interface to display, in conjunction with the faceted search results, a control to allow a user to select a search facet topic, where the search facet topic is a facet topic from the facet hierarchy that is not represented in the faceted search results.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 5 is a diagrammatic representation of one embodiment of a search user interface displaying example search results and one embodiment of a facet hierarchy interface.

FIG. 6 is a diagrammatic representation of one embodiment of an updated search user interface displaying example faceted search results and one embodiment of an updated facet hierarchy interface.

FIG. 7 is a diagrammatic representation of one embodiment of an updated search user interface displaying example faceted search results and one embodiment of an updated facet hierarchy interface.

FIG. 8 is a diagrammatic representation of one embodiment of an updated search user interface displaying example faceted search results and one embodiment of an updated facet hierarchy interface.

FIG. 9 is a diagrammatic representation of one embodiment of an updated search user interface displaying example faceted search results and one embodiment of an updated facet hierarchy interface.

FIG. 10 is a diagrammatic representation of one embodiment of an updated search user interface displaying example faceted search results and one embodiment of an updated facet hierarchy interface.

FIG. 23 is a diagrammatic representation of one embodiment of an updated search user interface displaying example faceted search results and one embodiment of an updated facet hierarchy interface.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

Figure 1:
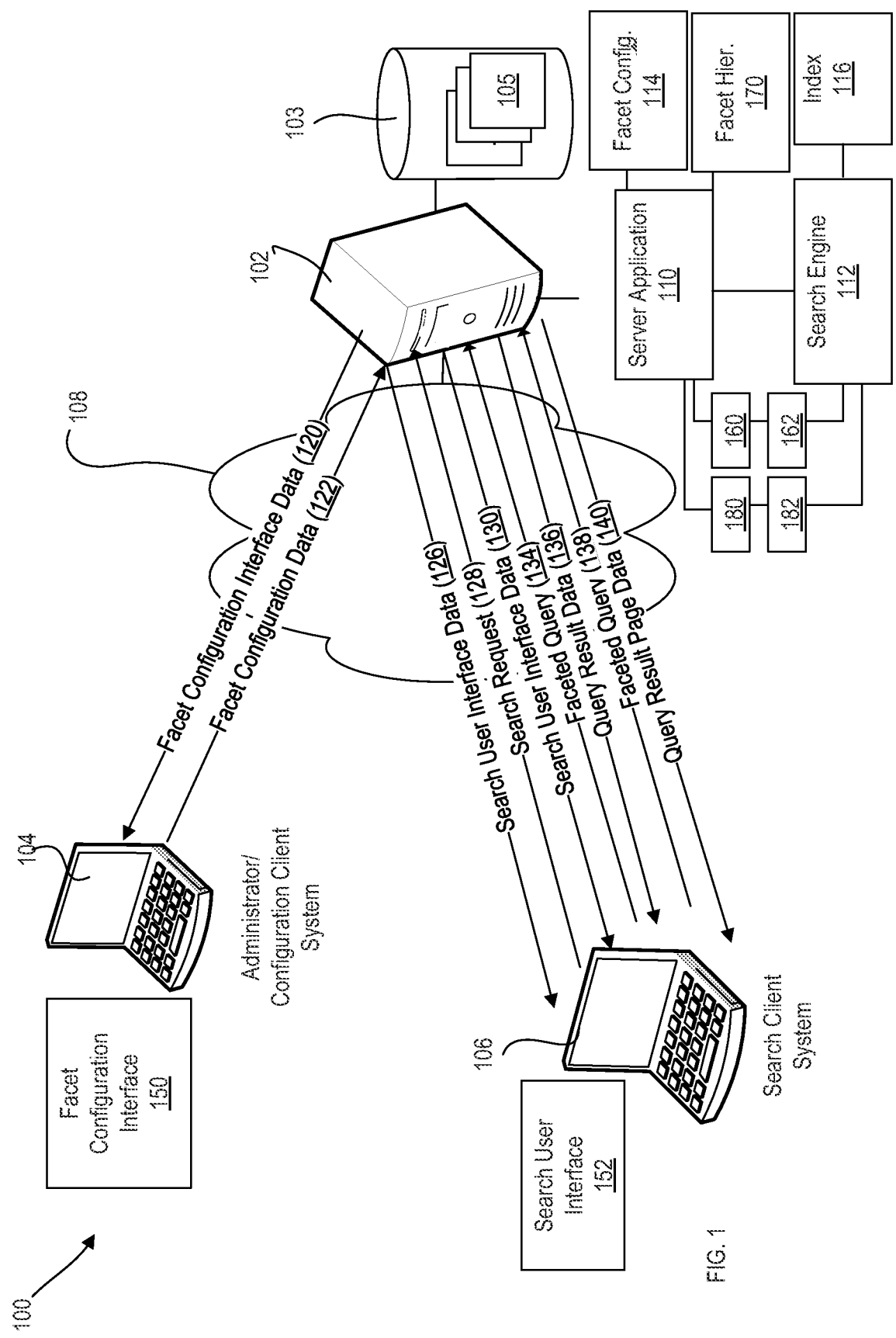
FIG. 1 is a diagrammatic representation of one embodiment of a system for multifaceted search.

FIG. 1 is a diagrammatic representation of one embodiment of a system which may be used to implement multifaceted search using a facet hierarchy. System 100 includes a search system 102 bi-directionally coupled to a configuration client system 104 and a search client system 106 by a network 108. Network 108 may comprise any suitable network such as a wide area network (WAN), the Internet, a local area network (LAN), a wired network, a wireless network, or a combination thereof. Search system 102, configuration client system 104 and search client system 106 can include processors, memories, network interfaces and other components.

According to one embodiment, search system 102 comprises a computer system with a central processing unit executing instructions embodied on a computer readable medium where the instructions are configured to perform at least some of the functionality associated with embodiments of the invention. These instructions may comprise one or more applications (instructions embodied on computer readable media) configured to implement a search application 110 and a search engine 112. In another embodiment, search engine 112 can be external to the search system 102 and/or can be hosted by separate computer devices communicatively coupled to the search system 102.

Search system 102, according to one embodiment, is coupled to a data store 103, which can be configured to support a storage structure for managing and storing a searchable collection of information objects 105, such as documents (web-pages, web page fragments, word processing documents and other documents), multi-media files, database records or other information objects. Each object 105 can be individually identifiable. The storage structure may comprise a database, a filesystem or combination thereof or other storage structure. According to one embodiment, an information object 105 can comprise a database record storing metadata for the object and an associated file storing content of the object.

The information objects 105 may be classified along multiple dimensions (facets) using facet classification techniques known or developed in the art. According to one embodiment, the facets are independent attributes used to classify objects 105. The classifications (facet topics) associated with an information object 105 may be derived from analysis of the information objects 105 using entity extraction or from analysis of fields in a data record storing attributes of the object 105. In some embodiments, the classifications associated with an information object 105 may be stored as metadata attributes of the information object 105.

According to one embodiment, objects 105 may be indexed in a search index 116, which may index content of objects 105, object attributes and facets. Search engine 112 can use search index 116 to search for objects 105 meeting search queries and return relevant search results. Each search result for a query can represent an information object 105 that meets the query. For each result, search engine 112 can return the facet topics associated with each search result.

Search application 110 is adapted to support multifaceted search using a facet hierarchy. According to one embodiment, search system 102 comprises a memory configured with a facet configuration 114 that includes a facet hierarchy definition. Search application 110 utilizes the facet hierarchy definition and the facet topics associated with a set of search results to generate a facet hierarchy for the set of search results. Search application 110 can further configure a search user interface to allow a user to select facet topics from the facet hierarchy to generate faceted queries.

Configuration client system 104 comprises a computer system with a central processing unit executing instructions stored on a computer readable medium to present a facet configuration interface 150 via which a user with sufficient privileges can configure search system 102. Facet configuration interface may be implemented in a variety of manners. By way of example, but not limitation, facet configuration interface 150 may comprise a web page, a mobile application page or an interface provided by a thick client.

Search client system 106 comprises a computer system with a central processing unit executing instructions stored on a computer readable medium to present a search user interface 152. Search user interface 152 via which a user can generate queries to search information objects and view search results. Search user interface 152 may be implemented in a variety of manners. By way of example, but not limitation, search user interface 152 may comprise a web page, a mobile application page or an interface provided by a thick client.

In operation, a user with sufficient privileges to configure search application 110 can log in to search system 102. Responsive to a request to create or update a facet hierarchy, search system 102 can provide facet configuration interface data 120 to configuration client system 104 to configure or provide facet configuration interface 150. According to one embodiment, configuration interface data 120 comprises a web page or portion of a web page (e.g., HTML, CSS, Javascript for a page or page fragment). Facet configuration data 122 received or generated based on user interaction with the configuration interface 150 is received at search application 110, which creates or updates facet configuration 114.

Search client system 106 can connect to search system 102 and search application 110 can provide search user interface data 126 to search client system 106 to configure or provide search user interface 152. According to one embodiment, search user interface data 126 comprises a web page or portion of a webpage (e.g., HTML, CSS, Javascript for a page or page fragment).

Based on user interaction with search user interface 152, search user interface 152 can send a search request (such as full text search request) to search application 110 and search application 110 can apply the search request to search engine 112. Search engine 112 may return a set of results 160 and associated facet topics 162 corresponding to search request 128 with no facet constraints applied in the search (a non-faceted search). According to one embodiment, search engine 112 or search application 110 may cache results 160 and facet topics 162. As will be appreciated, the facets and facet topics for the set of search results 160 can organize the search results 160 into a multidimensional information space in which subsequent faceted queries 134, 138 are evaluated.

Search application 110 determines a facet hierarchy 170 for the set of search results 160 according to the facet configuration 114, where the facet hierarchy 170 determined for the set of search results 160 includes the facet topics represented in the set of search results 160 for search request 128. That is, facet hierarchy 170 includes the facet topics 162 associated with the results in the set of search results 160.

Search application 110 can provide search user interface data 130 to search client system 106 to update search user interface 152 (e.g., replace all or a portion of search user interface 152) to display search results from the set of search results 160. According to one embodiment, search user interface data 130 comprises a web page or portion of a webpage (e.g., HTML, CSS, Javascript for a page or page fragment).

The search user interface 152 may include a search results display and a facet interface. The facet interface may be a facet hierarchy interface configured to display a representation of facet hierarchy 170 and provide controls to allow the user to select facet topics from the facet hierarchy 170. In some embodiments, the facet hierarchy interface is configured with the entire facet hierarchy 170, but only displays particular portions of the hierarchy based on rules and user interface events. In other embodiments, search application 110 provides portions of the hierarchy as needed for display.

According to one embodiment, the search user interface is configured to receive a facet topic selection based on user interaction with the search user interface and generate a faceted query 134 to search application 110. In another embodiment, the search user interface sends the facet topic selection to search application 110, which then generates faceted query 134 based on the selections. The faceted query 134 can specify further constraints on the set of search results 160 and updates the navigational context of the search.

Search application 110 can apply the search request to search engine 112. Search engine 112 returns faceted search results 180 from set of results 160 and associated facets/facet topics 182 corresponding to the current navigational context (corresponding to faceted query 134). The faceted search results 180, according to one embodiment, are a subset of the set of search results 160 corresponding to search request 128 that match the faceted query 134.

Search application 110 generates query result data 136 (e.g., search user interface data) that includes data to update the search user interface 152 to display the faceted search results and to update the facet hierarchy interface. According to one embodiment, faceted query result data 136 comprises a web page or portion of a webpage (e.g., HTML, CSS, Javascript for a page or page fragment).

Based on user input via the search user interface, search user interface 152 can send additional faceted queries 138 (or facet topic selections) to search application 110 and search application 110 can provide faceted query result data 140 to update the search results display and facet hierarchy interface accordingly.

According to one embodiment, each faceted query 134, 138 using facet topics determined for the set of search results 160 for a non-faceted search can be applied to that entire set of search results 160, rather than the prior faceted search results. That is, each faceted query 134, 138 generated based on facet topics from a facet hierarchy 170 determined for a set of search results 160 from a non-faceted search can be applied to that set of search results 160, rather than to a reduced set of faceted search results 180 from the previous faceted query.

If the user submits a second full-text search request 128 (or other non-faceted query), a new set of results 160 and associated facets and facet topics 162 can be determined (e.g., a new multidimensional information space can be defined in which subsequent faceted queries from the user are evaluated).

FIGS. 2-10 are diagrammatic representations illustrating example embodiments of facet configuration interface 150 presented to a configuration user, facet hierarchy 170, and search user interface 152 presented to a search user. For purposes of FIG. 2-10, it is assumed that the information objects 105 in the searchable collection are documents and the documents are classified according to the following facets: a_content_type, r_modify_date, authors, r_object_type, a_status, zone, country, city, location_site, sub_type, custom_instruc, r_full_content_size.

Figure 2:
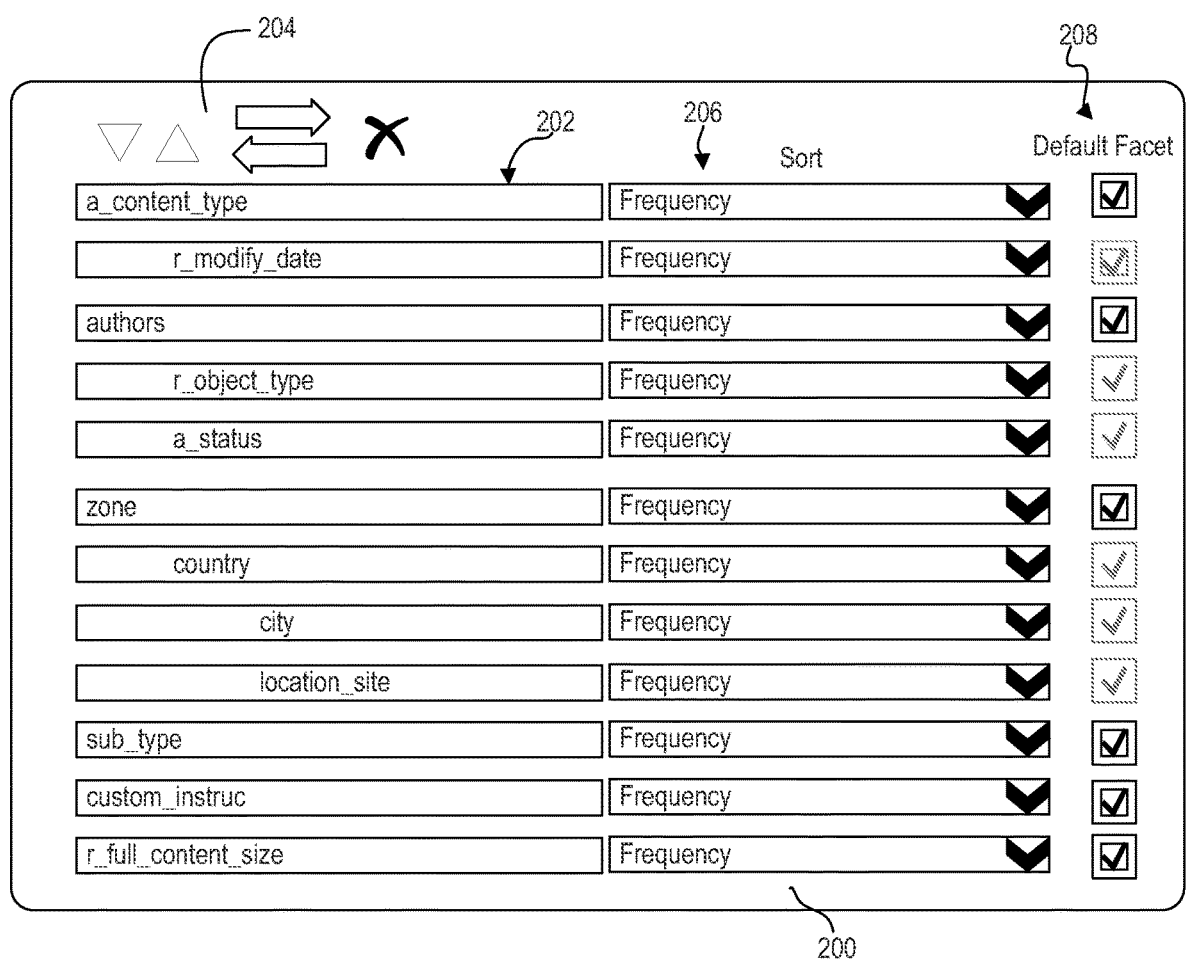
FIG. 2 is a diagrammatic representation of one embodiment of a facet configuration interface.

Turning to FIG. 2, a diagrammatic representation of one embodiment of a facet configuration interface 200 presented to a user is provided. According to one embodiment, facet configuration interface 200 includes controls to allow a configuration user to input a facet hierarchy definition. The facet hierarchy definition may comprise a hierarchical model that indicates facets and hierarchical relationships between the facets.

Facet configuration interface 200 can include user interface elements 202 (e.g., text input boxes, drop down menu or other controls) that allow a configuration user to select available facets to be added to a facet hierarchy model. In another embodiment, it is assumed that all available facets will be included in the facet hierarchy model and user interface elements 202 simply display the available facets.

Facet configuration interface 200 includes controls to allow a user to define hierarchical relationships between facets. Controls 204, for example, allow the user to hierarchically arrange the facets in the facet hierarchy model. Using controls 204, the user can move facets up or down and increase or decrease the indent level of the facets in the hierarchy model with the indent level of a facet specifying the hierarchical level of the facet in the facet hierarchy model. For example, a_content_type, authors, zone, sub_type, custom_instruc, r_full_content_size are defined as top level facets in the hierarchy model; r_object_type, a_status and country are defined as second level facets in the hierarchy model; and city and location_site are defined as third level facets in the hierarchy model. While the hierarchy model of FIG. 2 only has three levels, the hierarchy model may have any number of levels.

Further, the order of facets and indent levels can define parent-child relationships in the hierarchical model. According to one embodiment, a facet having a hierarchical level of n+1 in the hierarchy model is defined to be a child of the closest preceding n level facet. Thus, the placement r_object_type immediately after authors defines a parent-child relationship in which the r_object_type facet is defined as a child of the authors facet. As another example, the placement of a_status after authors defines a parent-child relationship in which the a_status facet is defined as a child of the authors facet. Similarly, city is defined as a child of country which is, in turn, defined as a child of zone in the facet hierarchy model.

The facet hierarchy model defines one or more facet groups. The definition of a facet group, according to one embodiment, indicates a top level facet for the group and, in some cases, one or more descendent facets. For example, the order and indent levels of a_content_type and r_modify_date provide a definition for a first facet group in which a_content_type is the top level facet and r_modify_date is a child of a_content_type. Similarly, the order and indent level of authors, r_object_type and a_status provide a definition for a second facet group in which authors is the top level facet and r_object_type and a_status are children of authors. As another example, the order and indent levels of zone, country, city and location_site, provide a definition for a third facet group in which zone is the top level facet, country is a child of zone, and city and location_site are children of country. Further, the order and indent levels of sub_type, custom_instruc and r_full_content size provide definitions for fourth, fifth and sixth facet groups respectively (each of the fourth, fifth and sixth facet group having a single facet).

Sort controls 206 indicate a rule by which facets are to be sorted for display in a search user interface. Frequency indicates that facets will be arranged in the descending order of frequency in the search user interface. Other options may include for example, ascending or descending alphabetical order, or other ordering options.

Default controls 208 specify whether a facet should be included by default in the search user interface for an initial search result. As will be discussed below, various rules may be applied to determine which facets are included in the search user interface in response to faceted queries.

The facet hierarchy definition provided via facet configuration interface 200 can be stored at the search system 102 as part of a facet configuration 114.

Figure 3:
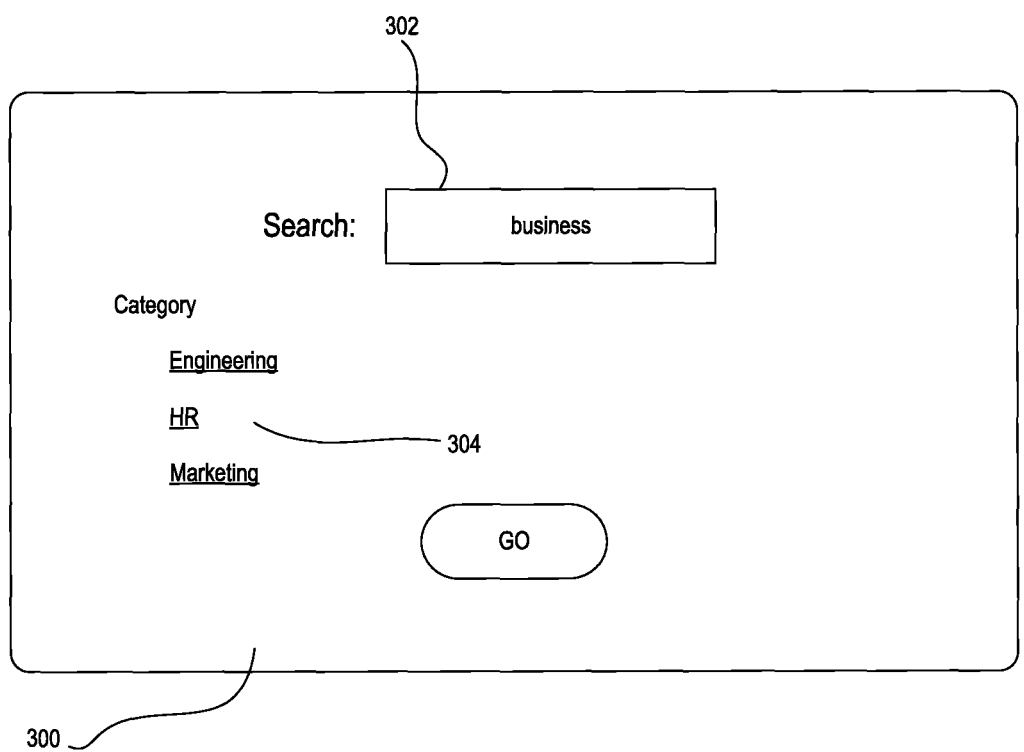
FIG. 3 is a diagrammatic representation of one embodiment of a search user interface to allow a user to input a non-faceted search query.

FIG. 3 illustrates one embodiment of a search user interface 300 presented to a user to allow a user to input a search request (e.g., search request 128). In this example, search user interface 300 provides a control 302 that allows the user to enter a full text search request and controls 304 allow the user to select to search for a general category of information elements (e.g., Engineering documents, HR documents or Marketing documents). In the illustrated example, the user has input the full-text search expression to search for documents that contain the term "business". In some embodiments, selecting controls 304 may also result in a full-text query being generated.

For the sake of example, it is assumed that the search engine 112 identifies 504 documents that meet the search query "business." In this example, each result in set of search results 160 can represent one of the 504 documents. Further, for each result, search engine 112 can provide facet topics 162 associated with the result.

Figure 4A:
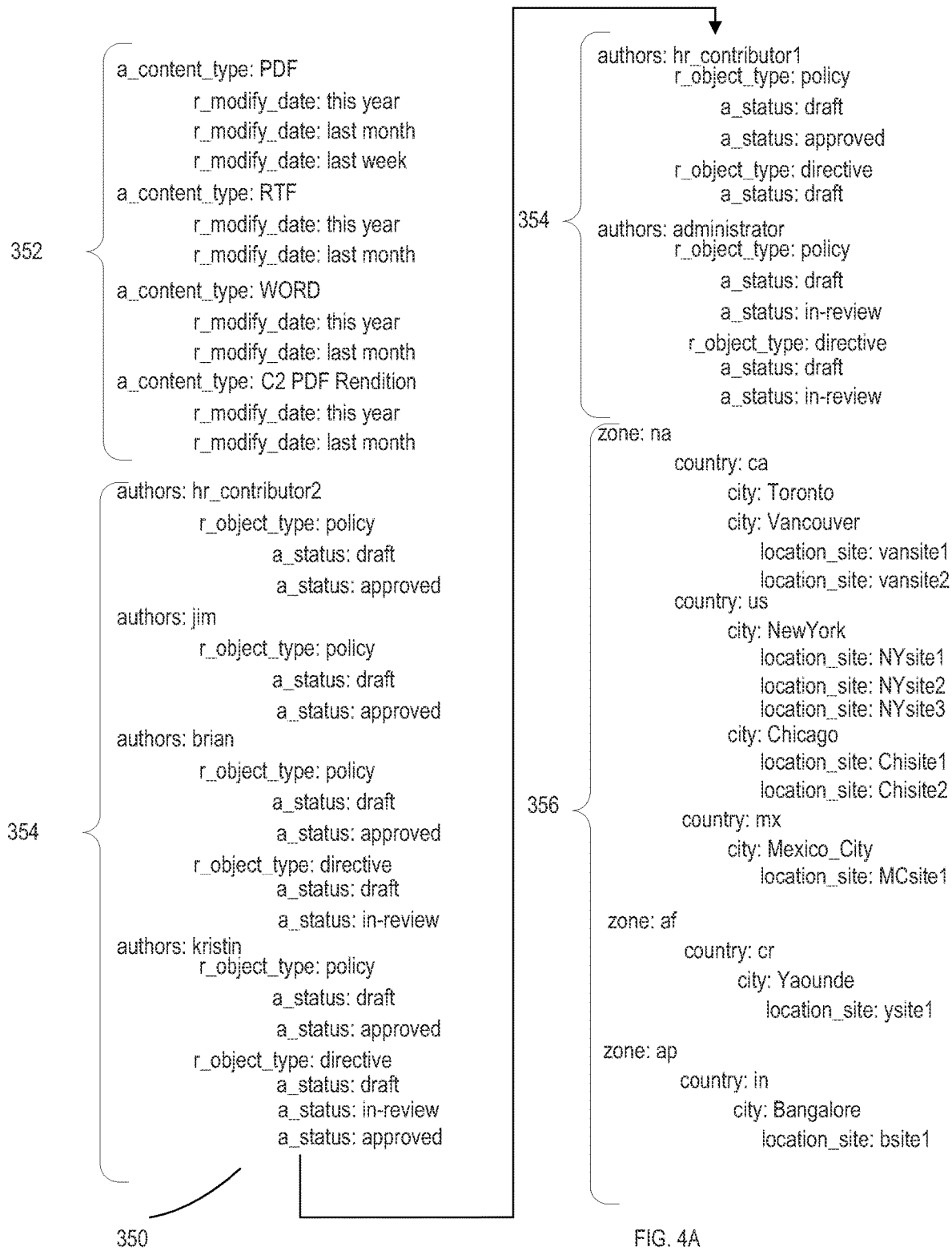
FIGS. 4A and 4B are diagrammatic representations of one embodiment of a facet hierarchy.
Figure 4B:
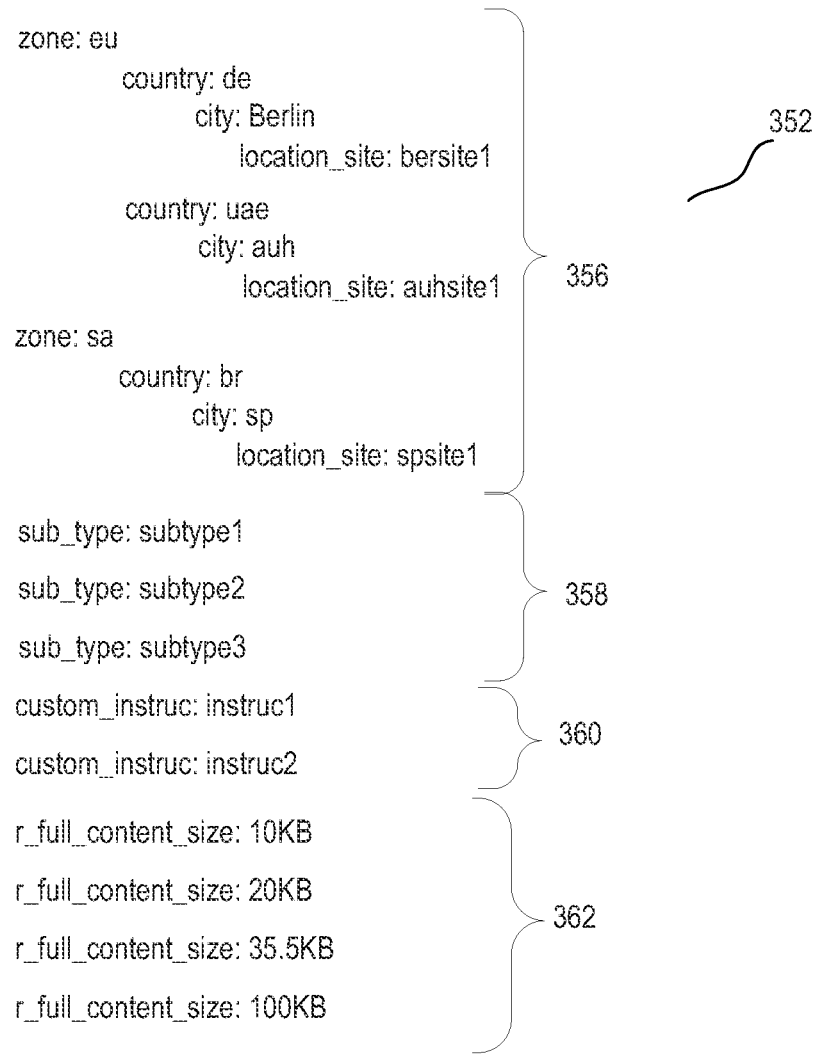

Search application 110 can determine a facet hierarchy for set of search results 160 using the facet configuration definition and facet topics 162. FIG. 4A and FIG. 4B illustrate an example of one embodiment of a facet hierarchy 350, which may be an example of a facet hierarchy 170. According to one embodiment, the facet hierarchy is maintained as a graph or tree structure in which the nodes represent facet topics and the edges represent parent-child relationships between the topics.

In the example of FIGS. 4A and 4B, facet hierarchy 350 is determined according to the facet hierarchy model defined in FIG. 2 and populated using the facet topics 162 associated with set of search results 160 (e.g., the search results from the search query entered in FIG. 3).

In the illustrated example, facet hierarchy 350 includes facet groups 352, 354, 356, 358, 360, 362, each comprising facet topics represented by the example set of search results 160. For a top level facet in a facet group, search application 110 can determine all the facet topics represented in the search results 160 for that facet and populate the hierarchy accordingly. For example, if it is assumed that various results in set of results 160 are associated with the facet topics a_content_type:PDF, a_content_type:RTF, a_content_type:WORD or a_content_type:C2 PDF Rendition for the a_content_type facet, then the a_content_type facet topics for facet group 352 can be populated in hierarchy 350 as illustrated. Because these facet topics are facet topics of the same facet, they can be considered sibling facet topics.

If a parent facet has a child facet according to the facet hierarchy definition, search application 110 can determine the group of results associated with a selected parent facet topic and determine the facet topics for the child facet that are associated with that group of results. This can be repeated for each parent facet topic.

For example, search application 110 can determine the group of results from set of search results 160 that are associated with the a_content_type:PDF facet topic, and determine all the r_modify_date facet topics associated with the results in that group. In the example of FIG. 4A, at least one of the results in set of results 160 associated with a_content_type:PDF is also associated with r_modify_date: this year, at least one of the results in set of results 160 associated with a_content_type:PDF is also associated with r_modify_date:last month and at least one of the results in set of results 160 associated with a_content_type:PDF is also associated with r_modify_date:last week. The children of facet topic a_content_type:PDF for results in set of results 160 are thus r_modify_date:this year, r_modify_date:last month, and r_modify_date:last week in this example. This process can be repeated for each parent facet topic (each facet topic for a parent facet) and facet group to populate the facet hierarchy with facets or facet topics 162 according to the facet hierarchy definition.

According to one embodiment, the search application 110 can further analyze the search results for a given query, and count how many results correspond to each node in facet hierarchy 350. For example, the search application can determine the number of results 160 associated with a_content_type:PDF; the number of results 160 in the initial set of search results associated with a_content_type:PDF AND r_modify_date:this year; the number of results in the initial set of search results that are associated with a_content_type: PDF AND r_modify_date:last month; the number of results in the initial set of search results that are associated with a_content_type:PDF AND r_modify_date:last week and so on.

As discussed above, search application 110 can provide search user interface data 130 to search client system 106 to update search user interface 152 to display search results from a set of search results 160. FIG. 5 is a diagrammatic representation of one embodiment of a search user interface 500 (e.g., a search results page) presented to a search user to display results from search results 160 in which the search results are the results of the search from FIG. 3.

Search user interface 500 includes a search results display 504 to display results from a set of search results 160. For example, search result display 504 in FIG. 5 displays the first ten documents from the set of search results 160.

Search user interface 500 also includes a facet hierarchy interface 502 that is configured to display a representation of the facet hierarchy determined for the set of results 160 in conjunction with the results from the set of results 160. In the example illustrated, search user interface 500 presents a subset of the facet topics of the facet hierarchy (e.g., presents representations of particular nodes of hierarchy 350). The representations of facets and facet topics may be displayed in a visual hierarchy in accordance with the facet hierarchy being represented.

The internal facet names and facet topics (values) may be mapped to more user-friendly labels in the facet hierarchy interface. For example, the facet a_content_type is represented as the "Format" facet, a_content_type:WORD is represented as the facet topic "WORD Document", zone:na is represented as the facet topic "North America", "zone:ap" is represented as the facet topic "Asia Pacific" among other examples. Facet hierarchy interface 502 is further configured to display a count of the search results corresponding to displayed nodes, where the count for a facet hierarchy node is displayed in visual association with the representation of the facet hierarchy node.

In some embodiments, facet hierarchy interface 502 may be configured with information needed to present every node of the facet hierarchy and with code to selectively present or hide each node (that is, code to selectively present or hide representations of the nodes). In the illustrated embodiment of FIG. 5, only the facet topics for the top level facet in each facet group is displayed along with the corresponding count (facet topics for additional facet groups may be viewed by scrolling down in the facet hierarchy interface). The facets are arranged based on frequency as specified in facet configuration interface 200.

In general, when a user selects a facet topic in the facet hierarchy interface 502, the search user interface can generate a faceted query to search application 110. The search user interface may be configured to wait a certain period of time after a facet topic selection to allow the user to select multiple facet topics such that a single faceted query may be generated based on the selection of multiple facet topics. In another embodiment, the user may select multiple facet topics in facet hierarchy interface 502 and then indicate that the search user interface should generate a faceted query through interaction with a control (e.g., a button or other UI element) provided for that purpose.

For the sake example, search user interface 500 can be configured to generate a faceted query (e.g., faceted query 134) of {zone EQUAL ap} responsive to the user clicking on "Asia Pacific" without selecting any other facet topics. The faceted query 134 is sent to search application 110, which applies the query to search engine 112. Search engine 112 returns the set of results 180 from set of results 160 that match the query and the facets/facet topics 182 associated with faceted search results 180. In this example, the faceted search results 180 are the subset of the set of search results 160 that have an associated facet topic 162 of zone:ap. Search application 110 determines the number of results in the faceted search results 180 that correspond to each node in facet hierarchy.

For the sake of example, it is assumed that only one search result in set of search results 160 is associated with zone:ap and that search result is also associated with country:in, a_content_type:WORD, authors:Administrator, r_modify_date:this year.

Search application 110 generates query result data 136 (e.g., search user interface data) that includes data to update the search user interface 152 to display results from the faceted search results 180 and update the facet hierarchy interface. According to one embodiment, search application 110 returns results from faceted search results 180 and an indication of the number of faceted search results that match each node in the facet hierarchy (at least for nodes for which there is at least one faceted search result and updates the search user interface accordingly.

In one embodiment, search application 110 further determines the facet hierarchy nodes display in conjunction with the faceted search results and generates query result data 136 to update the search user interface. For example, search application 110 may provide a new page or page fragment to search client system 106 to cause search client system 106 to present facet hierarchy interface 602 in conjunction with results display 604.

According to another embodiment, the search user interface at the search client system 106 combines local information and information from the server to determine which nodes (facet topics) to represent in the facet hierarchy interface and updates the facet hierarchy interface accordingly. For example, the result data 136 may include results from the faceted search results 180 and data to indicate zone:ap=1, country:in=1 and a_content_type:WORD=1, authors:Administrator=1, r_modify_date:this year=1 and, based on this result data 136 and the user selections, the search user interface selectively hides or reveal facet topics of the facet hierarchy.

Figure 6:
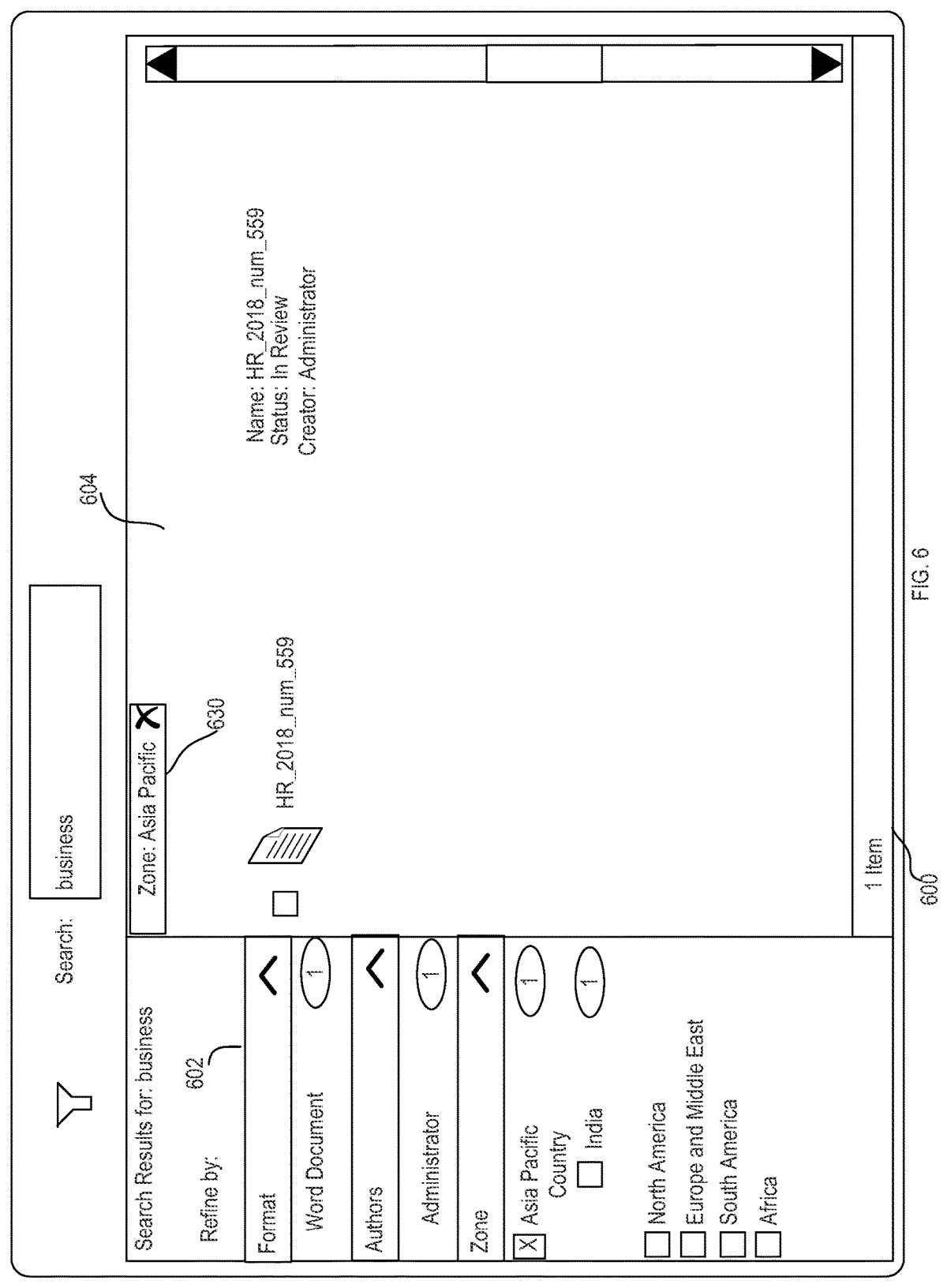

FIG. 6 is a diagrammatic representation of one embodiment of an updated search user interface 600 (e.g., a faceted query result page) updated based on the faceted query generated responsive to the user's selection of "Asia Pacific." In FIG. 6, the search results display 604 is updated to display the faceted search result. Further, the facet hierarchy interface 602 is updated to show an updated set of facet topics and related counts for the faceted search result.

It can be noted that in FIG. 6, several of the facet topics represented in facet hierarchy interface 602 are not represented in the current faceted search results 180. A facet topic from the facet hierarchy not represented in the faceted search results for a faceted query generated based on the facet hierarchy can be referred to as a "search facet topic" because the facet topic is represented in the set of search results 160 prior to the search results 160 being narrowed by one or more faceted queries. In this example, facet hierarchy interface 602 includes controls to allow a user to select the search facet topics, North America (i.e., zone:na), Europe and Middle East (i.e., zone:eu), South America (i.e., zone:sa), Africa (i.e., zone:af), which are not represented by the current faceted search result determined by search system 102.

The search user interface may also include controls, such as controls 630, to allow the user to easily cancel selections.

Now assume the user further selects the "WORD Document" facet topic. A query can be generated based on all selected facet topics (e.g., {{zone EQUAL ap} AND {a_content_type EQUAL WORD}}. FIG. 7 is a diagrammatic representation of one embodiment of an updated search user interface 700 (e.g., a faceted query result page) updated based on a user's additional selection of the facet topic "WORD Document". When the user selects "WORD Document" from the Format facet, the other facet topics in the Format facet can be seen in conjunction with the faceted search results. The user can now easily unselect the "Asia Pacific" facet topic and select the PDF facet topic to search for documents not represented in the current faceted search results displayed in FIG. 7.

As discussed above, the search user interface may generate a faceted query based on a user's selections of facet topics. More particularly, the search user interface can generate queries based on the positions of the selected facet topics in the facet hierarchy. For example, assume the user deselects "Asia Pacific" and "WORD" and selects "North America" and "Europe and Middle East" from facet hierarchy interface 602. According to one embodiment, the search user interface can generate a query with the query expression {{zone EQUAL na} OR {zone EQUAL eu}}.

FIG. 8 is a diagrammatic representation of one embodiment of an updated search user interface 800 with the search result display 804 updated to display example results for the faceted query {{zone EQUAL na} OR {zone EQUAL eu}} and an updated facet hierarchy interface 802.

In some cases, a user may select multiple facet topics at various hierarchical levels within a facet group. For example, the user may further select "United States" in the facet hierarchy interface 802 of FIG. 8 (clicks checkbox 810). Responsive to this selection, the search user interface can generate a search expression such as:
{{{zone EQUAL na} AND {country EQUAL us}} OR {zone EQUAL eu}}

It can be noted that this query may be applied against the set of search results 160 (the set of search results for the full-text search "business") rather than the results of the last faceted search.

FIG. 9 is a diagrammatic representations of one embodiment of an updated search user interface 900 with the facet hierarchy interface 902 updated and the search result display 904 updated based on the example faceted query {{{zone EQUAL na} AND {country EQUAL us}}OR {zone EQUAL eu}}}.

In the examples of FIGS. 8 and 9, the user selected facet topics within the same facet group. However, a user may also select facet topics across facet groups. FIG. 10, for example, is a diagrammatic representation of one embodiment of a search user interface 1000 in which the user has selected facet topics across facet groups as illustrated in the display of facet hierarchy interface 1002.

According to one embodiment, the selections as illustrated in FIG. 10 may correspond to a complex query, such as:
{{{{authors EQUAL jim} AND {type EQUAL policy}} OR {{authors EQUAL brian} AND {type EQUAL directive}}} AND {{{zone EQUAL na} AND {country EQUAL us}} OR {{zone EQUAL eu} AND {country EQUAL de}}}}

FIG. 10 further illustrates that search user interface 1000 may include a results display 1004 to display the results of the complex faceted query.

Figure 11:
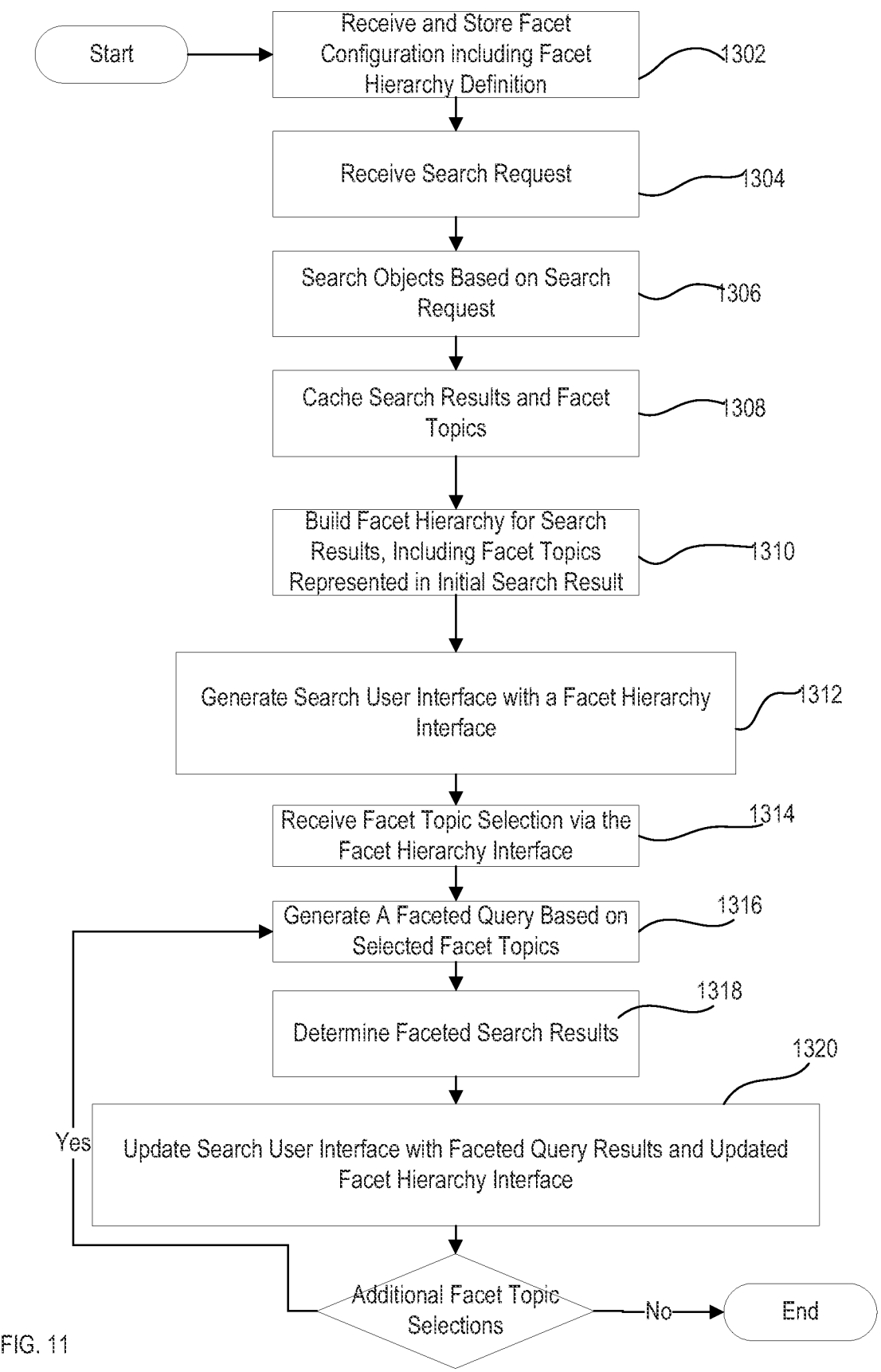
FIG. 11 is a flow chart illustrating one embodiment of a method for multifaceted search.

FIG. 11 is a flow chart illustrating one embodiment of a method for multifaceted searching. At step 1302, facet configuration data is received and a facet configuration (e.g., facet configuration 114) stored. At step 1304 a non-faceted search request is received. At step 1306, a searchable collection of objects is searched and a set of search results for the search request are determined. Furthermore, the set of facet topics associated with the set of search results is determined. The search results and associated facet topics determined at step 1306 can be cached (step 1308).

At step 1310, a facet hierarchy is generated for the set of search results using the facet configuration. At step 1312, a search user interface is generated. For example, a web page may be generated (including HTML, Javascript, CSS or other web page code to implement the user search interface.) The search user interface may comprise a results display to display results from the set of search results (e.g., the results determined at step 1306) and a facet hierarchy interface to display a representation of the facet hierarchy in conjunction with the results from the set of results. The facet hierarchy interface may include controls to allow a user to select facet topics (including multi-select facet topics) from the plurality of facet topics.

At step 1314, a facet topic selection is received via the facet hierarchy interface (e.g., based on user interaction with the facet hierarchy interface). The facet topic selection may include a selection of multiple facet topics in the facet hierarchy.

At step 1316, a faceted query is generated based on the facet topic selection. According to one embodiment, the faceted query may be generated by the search user interface. According to another embodiment, the facet topic selection may be sent to a search application and the faceted query generated at the server.

At step 1318, the set of faceted search results are determined. According to one embodiment, the faceted query is applied to the search results of the non-faceted query to determine the faceted search results. The faceted search results comprise a subset of the set of search results of the non-faceted query that match the faceted query.

At step 1320, the search user interface may be updated. For example, a search results display can be updated to display faceted search results. Further the facet hierarchy interface can be updated. According to one embodiment, the updated facet hierarchy interface can be configured to display, in conjunction with the faceted search results, a control to allow a user to select a search facet topic, where the search facet topic is a facet topic from the facet hierarchy that is not represented in the faceted search results.

Steps 1316-1320 can be repeated for an additional facet topic selection. It can be noted that each faceted query based on a facet hierarchy determined from the search results to a non-faceted search, may be applied to the search results of the non-faceted search (e.g., the search results cached at step 1308 in one embodiment).

The steps of FIG. 11 may be repeated as needed or desired, additional steps performed, steps omitted or alternative steps practiced in various embodiments.

Figure 12A:
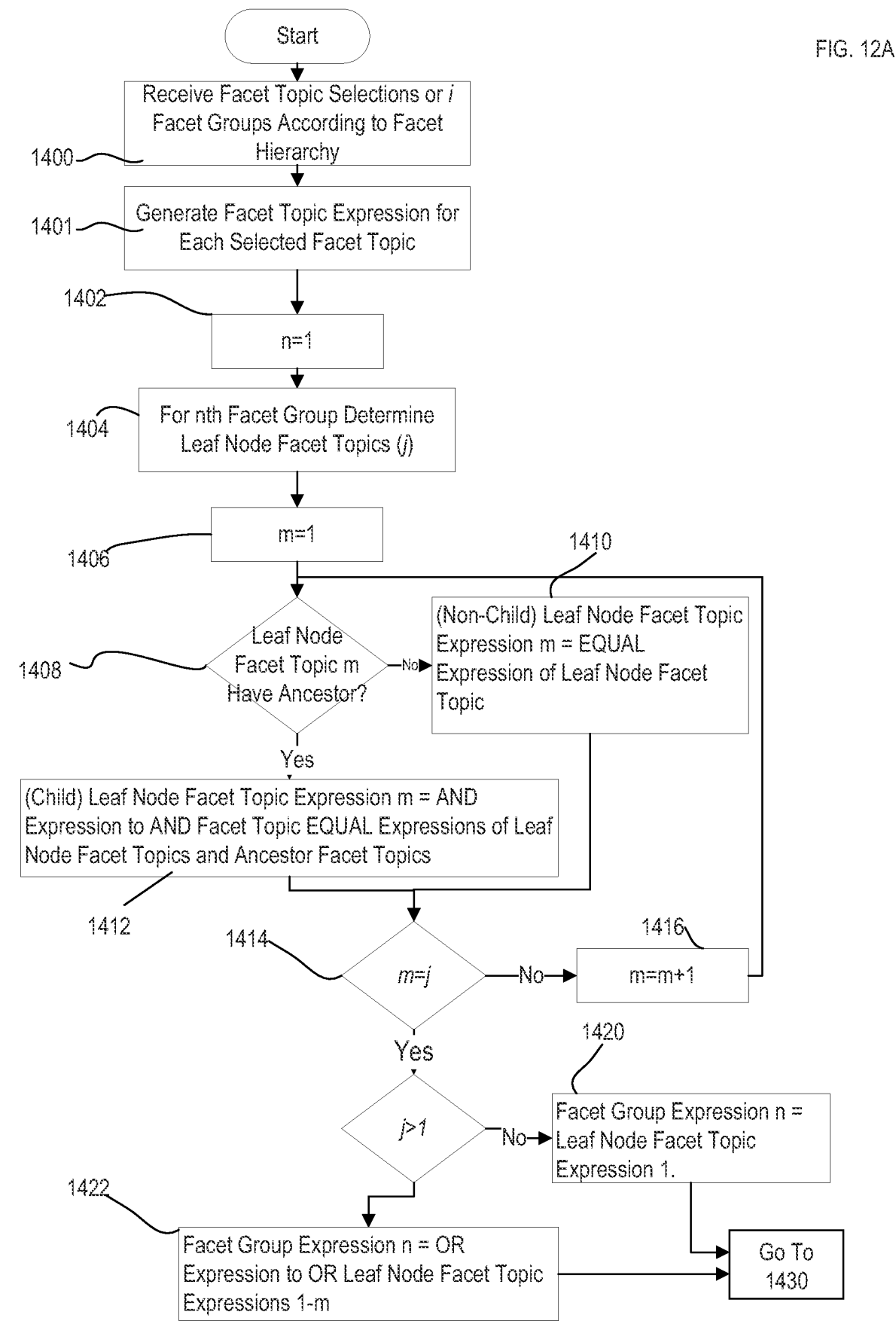
FIG. 12A and FIG. 12B are a flow chart illustrating one embodiment of a method of generating a faceted query.
Figure 12B:
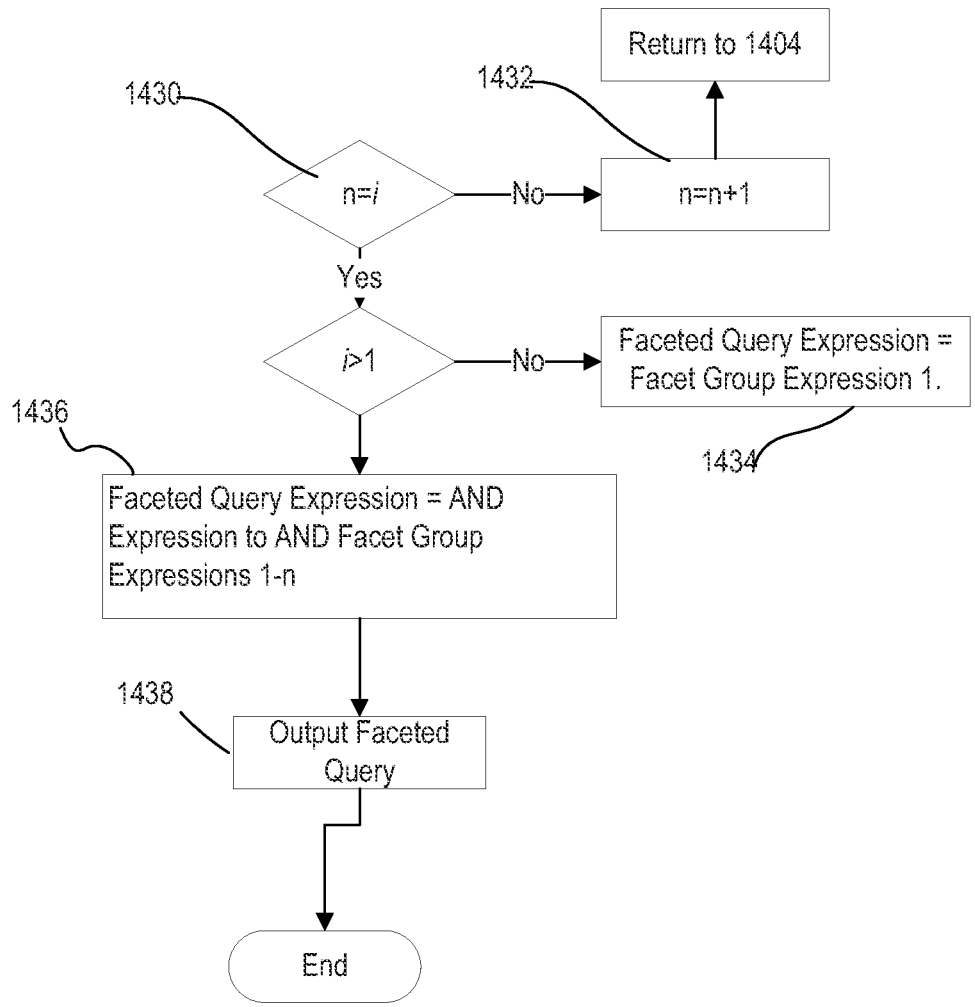

FIG. 12A and FIG. 12B are a flowchart illustrating one embodiment of a method for generating a faceted query based on facet topics selected from a facet hierarchy. According to one embodiment, the method of FIGS. 12A and 12B may be implemented at a search user interface at a search client system. In another embodiment, the method may be implemented at a search system server. For the sake of context, FIG. 12A and FIG. 12B will be discussed in terms of the selections illustrated in FIG. 10.

At step 1400, a facet topic selection indicating facet topics selected from i facet groups is received. In FIG. 10, for example, facet topics are selected from 2 facet groups (represented by the top level facets "Author" (authors) and "Zone" (zone).

At step 1401, a facet topic EQUAL expression is generated for each selected facet topic. If a child facet topic is selected, the parent facet topic can be considered to be implicitly selected if not explicitly selected by the user.

The following expressions can be generated for the facet topic selection of FIG. 10:
{authors EQUAL jim}
{type EQUAL policy}
{authors EQUAL brian}
{type EQUAL directive}
{zone EQUAL na}
{country EQUAL us}
{zone EQUAL eu}
{country EQUAL de}

At 1402 a loop is started to generate an expression for a facet group and a first facet group selected. For the selected facet group n, the leaf node facet topics are determined (step 1404). A leaf node facet topic is a facet topic indicated in the facet topic selection, where the facet topic is a node in the facet topic hierarchy for which no descendent node in the facet hierarchy is selected in the fact topic selection. In FIG. 10, for example, facet topics 1020, 1022 are leaf node facet topics of facet group 354 and facet topics 1024 and 1026 are the leaf node facet topics of facet group 356.

At step 1406 a loop is started to iterate through the leaf node facet topics in a facet topic group and a leaf node facet topic m selected. For example, leaf node facet topic 1020 can be selected. It is determined if the leaf node facet topic has any ancestor facet topics based on the facet hierarchy (step 1408). If not (e.g., if the leaf node facet topic is a facet topic for the top level facet in the facet group), control passes step 1410 and the leaf node facet topic expression is set as the EQUAL expression determined for the leaf node facet topic. For example, the leaf node facet topic expression for the selection of Asia Pacific in FIG. 6 can simply be {zone EQUAL ap} because the facet topic has no ancestor facet topics.

If the leaf node facet topic does have an ancestor facet topic, then the EQUAL expressions for the leaf node facet topic and each of its ancestor facet topics can be combined in an AND expression (step 1412). Using the example of leaf node facet topic 1020, the leaf node facet topic expression can be set as:
{{authors EQUAL jim} AND {type EQUAL policy}}

At step 1414 it is determined if there are additional leaf node facet topics in the facet group. If there are additional leaf node facet expressions in the selected facet group, steps 1408-1414 can be repeated for each leaf node facet topic in the facet group until it is determined that there are no unprocessed leaf node facet topics in the facet group n. Continuing with the example of FIG. 10, the leaf node facet topic expression for leaf node facet topic 1022 can be set as:
{{authors EQUAL brian} AND {type EQUAL directive}}

If there is only one leaf node facet topic from the facet group n indicated in the facet topic selection, then the facet group expression for the facet group n can be set to the leaf node facet topic expression for the single leaf node facet topic (step 1420). If there are multiple leaf node facet topics from the facet group n indicated in the facet topic selection, a facet group topic expression can be generated to OR the leaf node facet topic expressions for the leaf node facet topics from the facet group (step 1422). Using the example of FIG. 10, the facet topic expression for the "Author" (authors) facet group containing leaf node facet topics 1020, 1022, the facet group expression can be generated as:
{{{authors EQUAL jim} AND {type EQUAL policy}} OR {{authors EQUAL brian} AND {type EQUAL directive}}}

At step 1430, it is determined if there is an additional facet group from which facet topics were selected. If so, the next facet group is selected (step 1432) and control returns step 1404.

Thus, the steps 1404-1430 can be repeated for the facet group including the selected facet topics 1024, 1026 and a facet group expression generated:
{{{zone EQUAL na} AND {country EQUAL us}} OR {{zone EQUAL eu} AND {country EQUAL de}}}

If there is only one facet group from which facet topics were selected then the faceted query expression can be set to the facet group expression for that facet group (step 1434). Otherwise, the facet group expressions can be combined in an AND expression (step 1436). For example, the following expression can be generated using the example selections of FIG. 10:
{{{authors EQUAL jim} AND {type EQUAL policy}} OR {{authors EQUAL brian} AND {type EQUAL directive}}} AND {{{zone EQUAL na} AND {country EQUAL us}} OR {{zone EQUAL eu} AND {country EQUAL deff}}}

At step 1438 a faceted query can be output that includes the faceted query expression.

The steps of FIGS. 12A and 12B may be repeated as needed or desired, additional steps performed, steps omitted or alternative steps practiced in various embodiments.

Figure 13:
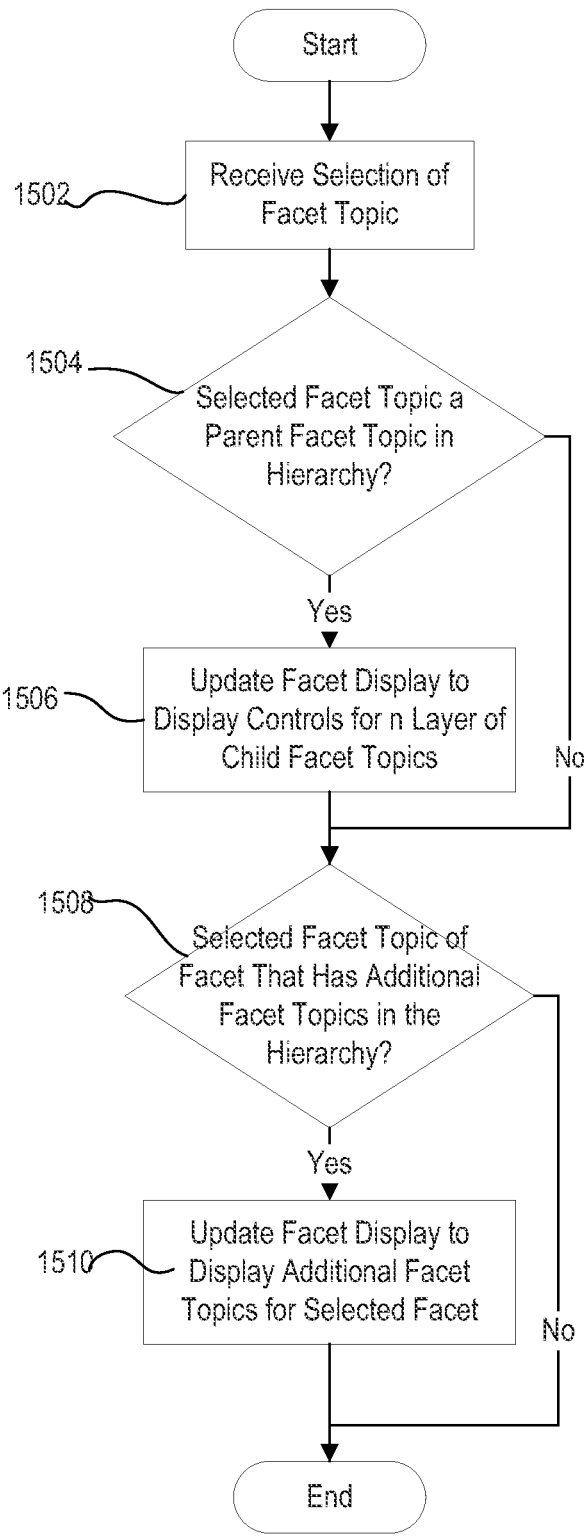
FIG. 13 is a flow chart illustrating one embodiment of a method of updating a facet hierarchy interface.

FIG. 13 is a flowchart illustrating one embodiment of a method to update the facet topics represented in a facet hierarchy interface. According to one embodiment, the method of FIG. 13 may be implemented at a search user interface at a search client system. In another embodiment, the method may be implemented at a search system server.

At step 1502, a facet topic selection is received based on user interaction of the facet hierarchy interface. The facet topic selection may indicate a selection of one or more facet topics. At step 1504, it is determined if a selected facet topic is a parent facet topic—that is, if the selected facet topic has descendent facet topics in the facet hierarchy. If the selected facet topic is a parent facet topic, n levels of descendent facet topics can be selected for display. For example, all descendent facet topics can be selected for display. In another embodiment, only a single level of descendent facet topics is displayed (only the children facet topics are selected for display).

At step 1506 the facet hierarchy interface can be updated to display the descendent facet topics selected for display. In some embodiments, the facet topics may be displayed with controls to allow the search user to select the facet topics. In FIG. 7, for example, the selection of "WORD Document" (i.e., a_content_type:WORD) resulted in the display of the children facet topics "This Year" (r_modify_date:this year) and "Last Month" (r_modify_date:last month) even though none of the relevant faceted search result were associated with the facet topic. "Last Month".

At step 1508 it can be determined if the selected facet topic has sibling facet topics in the facet hierarchy. In other words, it can be determined if the selected facet topic is a facet topic of a facet for which there are additional facet topics in the hierarchy. If so, the sibling facet topics can be selected for display (step 1510).

In FIG. 7, for example, the selection of WORD document (i.e., a_content_type:WORD) resulted in the display of the sibling facet topics, "PDF" (a_content_type:PDF), "Rich Text Format (RTF)" (a_content_type:RTF), "C2 PDF Rendition" (a_content_type:C2 PDF Rendition).

The steps of FIG. 13 may be repeated as needed or desired, additional steps performed, steps omitted or alternative steps practiced in various embodiments. For example, the steps of FIG. 13 may be repeated for each facet topic selected by a search user.

In the above example, facet topics are selected for display based on the relationships between facet topics specified in the facet hierarchy. In addition or in the alternative, other data structures may be used to determine which facet topics to display in conjunction with faceted search results or based on facet topic selections. According to one embodiment a likeliness structure may be used, some examples of which are discussed below. It can be noted that a likeliness data structure may be used in conjunction with a facet hierarchy or independent of a facet hierarchy.

Figure 14:
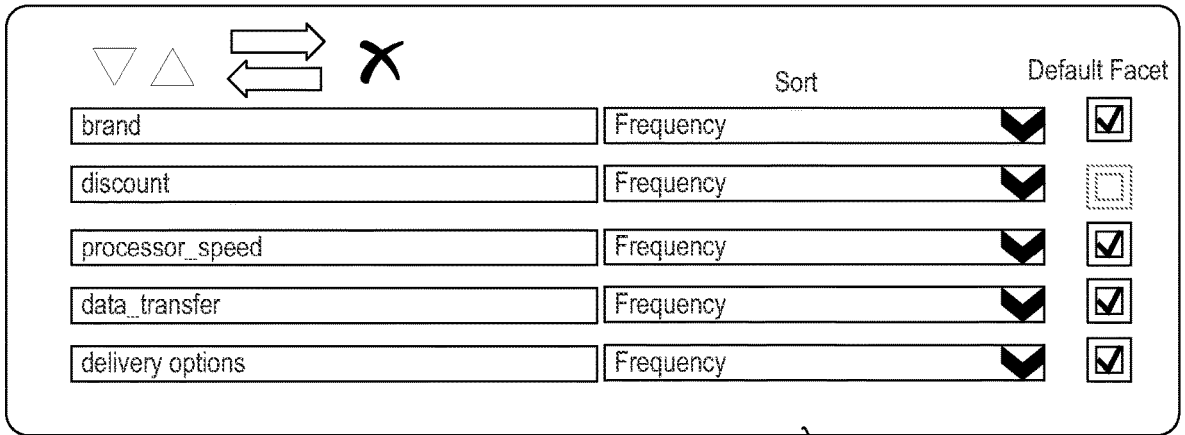
FIG. 14 is a diagrammatic representation of another embodiment of a facet configuration interface.

FIG. 14 illustrates one embodiment of a facet configuration user interface 1600 presented to a user, similar to the interface of FIG. 2, but for the facets: brand, discount, processor_speed, data_transfer, delivery options.

Figure 15:
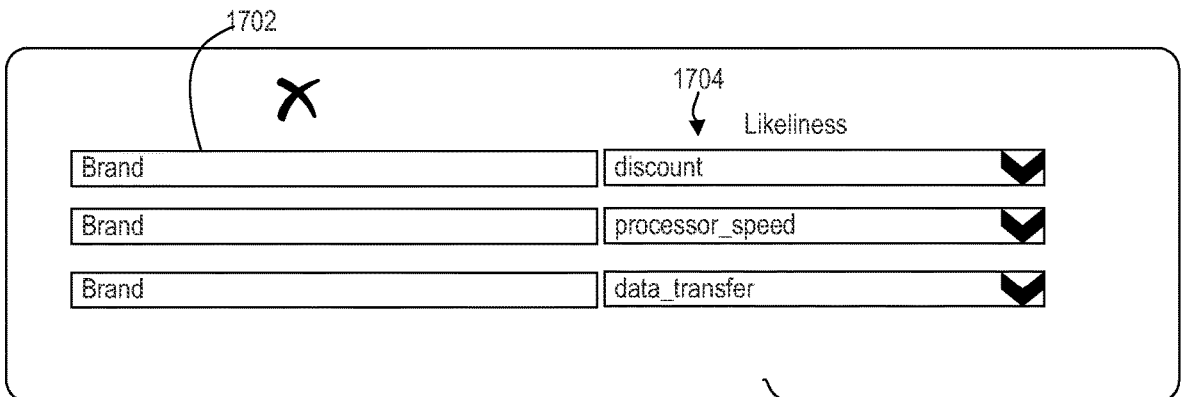
FIG. 15 is a diagrammatic representation of one embodiment of a facet configuration interface to define likeliness relationships.

FIG. 15 illustrates one embodiment of a second facet configuration interface 1700 in which the configuration user can define likeliness relationships between facets. The relationships can be referred to as likeliness relationships as they can be selected to represent facet topics that end-users are deemed likely to want to search given other facet topic selections. Facet configuration interface 1700 includes user interface elements 1702, 1704 (e.g., text input boxes, drop down menu or other controls) that allow a configuration user to select available facets and define likeliness relationships between facets.

A likeliness relationship defines a directional path between a path start facet and a path end facet. In the example of FIG. 15, the following paths have been defined: brand→discount; brand→processor_speed; brand→data_transfer. The path between facets is used to determine which facet topics to show a search user based on the user's selections of facet topics even if there are no relevant search results associated with the path end facet. While each path in FIG. 15 includes only a start facet leading to an end facet, paths may also be defined that include intermediate facets.

Figure 16:
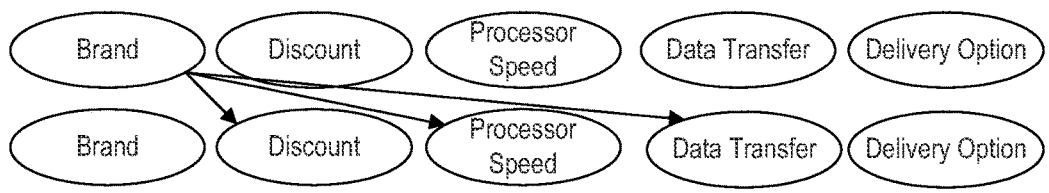
FIG. 16 is a diagrammatic representation of one embodiment of a likeliness data structure.

The likeliness relationships may be held in a trie or other search tree data structure or other likeliness data structure. FIG. 16 illustrates one embodiment of a trie to store likeliness relationships defined in FIG. 15. The likeliness relationship data structure represents the facets as nodes and the relationships as paths between the nodes.

According to one embodiment, search application 110 uses the likeliness data structure to determine which facet topics should be displayed with a faceted search result and to provide an indication to the search client. In another embodiment, the likeliness data structure can be provided to the search client and the search client can determine which facet topics to expose for display in conjunction with a faceted search result.

Figure 17:
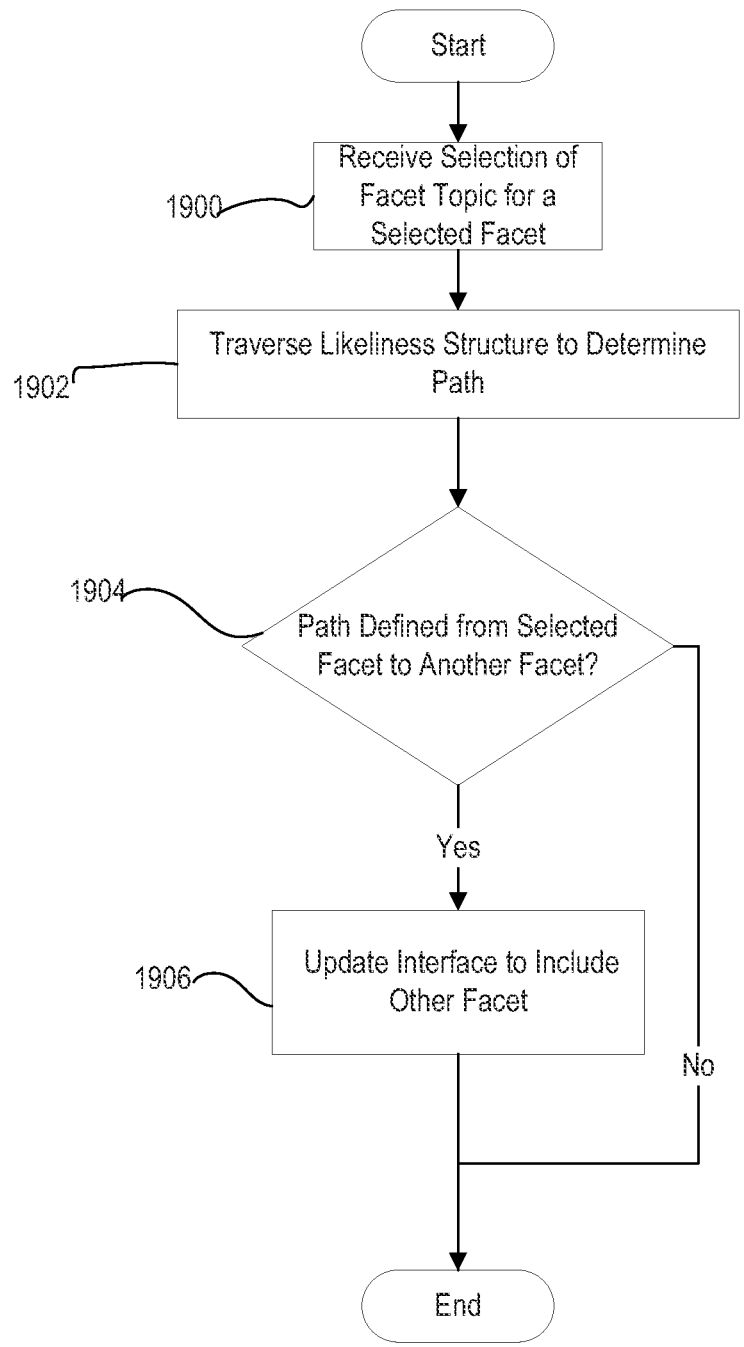
FIG. 17 is a flow chart illustrating one embodiment of a method of updating a facet hierarchy interface.

FIG. 17 is a flow chart illustrating one embodiment of a method to update a facet interface (e.g., a facet hierarchy interface) to display particular facet topics. According to one embodiment, the method of FIG. 17 may be implemented at a search user interface at a search client system. In another embodiment, the method may be implemented at a search system server (e.g., by search application 110).

At step 1900, a facet topic selection is received based on user interaction with a facet interface, such as a facet hierarchy interface. The facet topic selection may indicate the selection of one or more facet topics. At step 1902, the likeliness data structure is traversed to determine whether the selected facets match a path to an end facet; that is, whether the facets for which facet topics are selected match a path to an end facet. For example, it can be determined if the selected facets include the source facet and any intermediate facets of a path to an end facet. If the selected facets match a path to an end facet as determined at 1904, the facet interface is updated with the facet topics for the end facet (step 1906). The facet topics of the end facet may include search facet topics that are not represented in the faceted search results.

The steps of FIG. 17 may be repeated as needed or desired, additional steps performed, steps omitted or alternative steps practiced in various embodiments.

Figure 18:
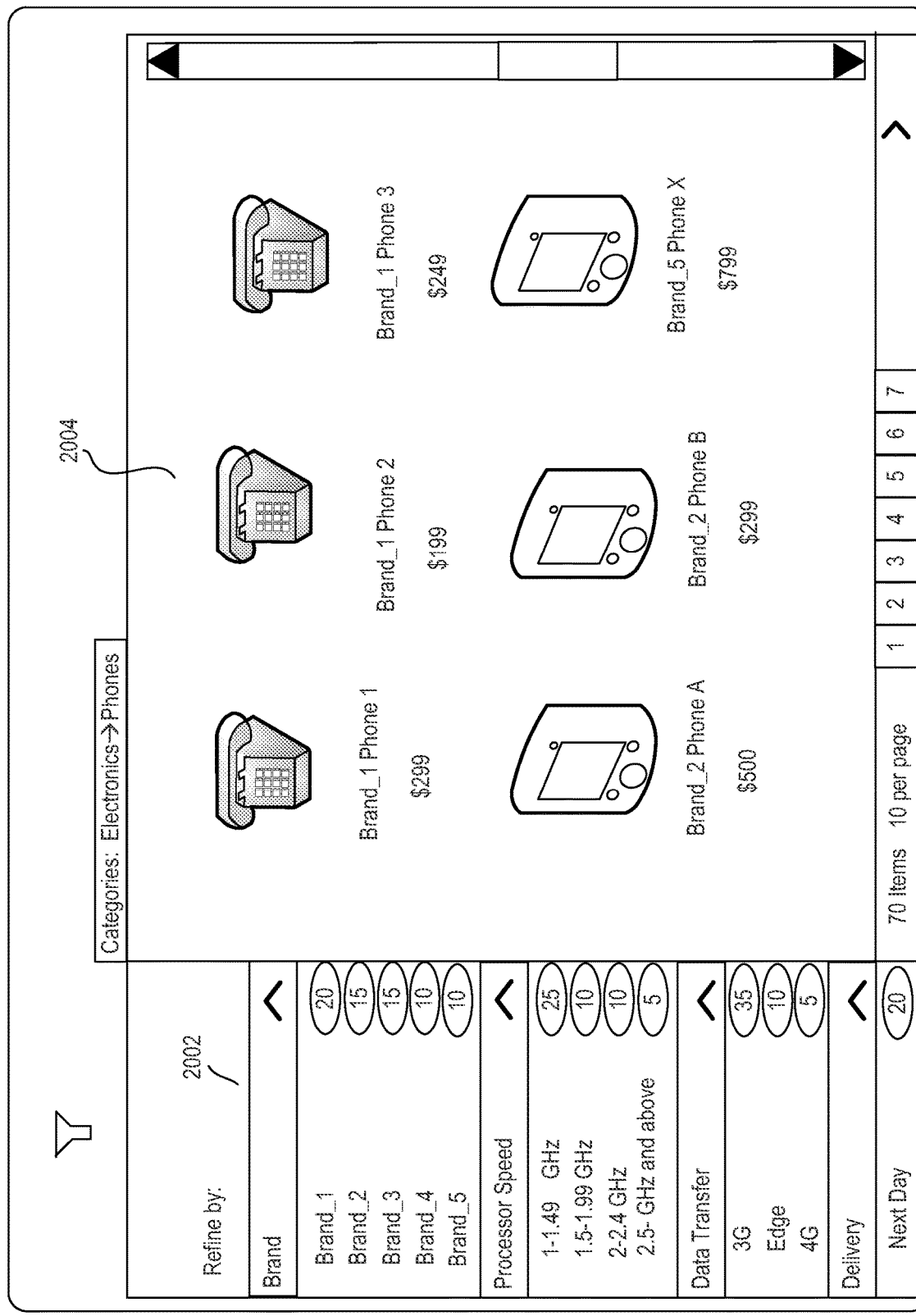
FIG. 18 is a diagrammatic representation of one embodiment of an updated search user interface displaying example faceted search results and one embodiment of an updated facet hierarchy interface.

FIG. 18 is a diagrammatic representation of one embodiment of a search user interface 2000 (e.g., a search results page) presented to a search user. In the example of FIG. 18, search user interface 2000 includes a search results display 2004 configured to display results for a non-faceted "phones" search. The search results to the non-faceted "phones" search can be an example of set of search results 160 in FIG. 1. The search user interface 2000 includes a facet interface 2002 configured to display a set of facets represented by the non-faceted search result. Facet interface 2002 may be a facet hierarchy interface that provides a representation of a facet hierarchy determined according to the facet hierarchy definition provided in FIG. 14.

Figure 19:
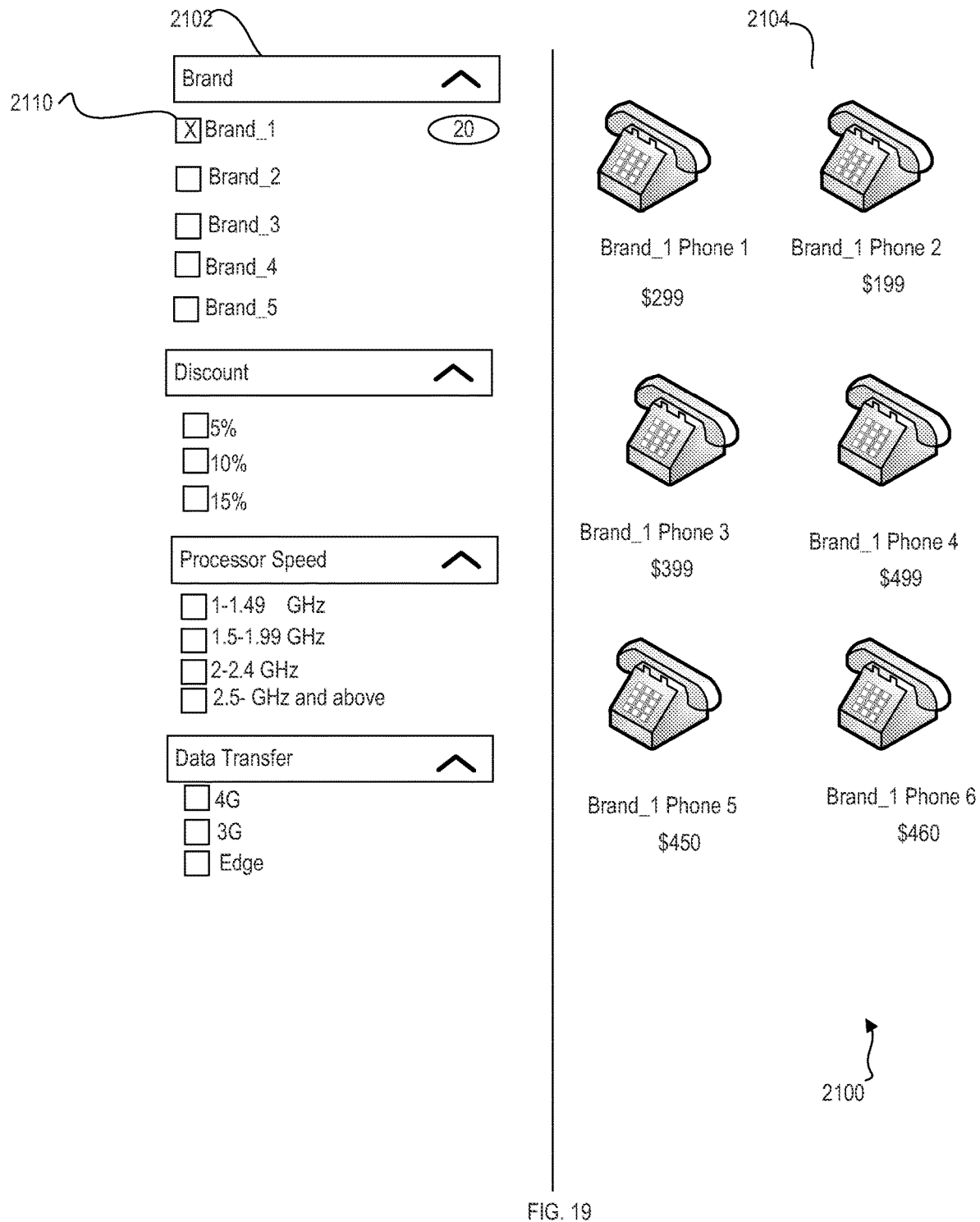
FIG. 19 is a diagrammatic representation of one embodiment of an updated search user interface displaying example faceted search results and one embodiment of an updated facet hierarchy interface.

FIG. 19 is a diagrammatic representation of one embodiment of an updated search user interface 2000 in which the user has selected the facet topic brand:brand_1. Based on the user selection of brand:brand_1, the search application 110 may return a set of faceted search results and a facet topic (node) count, such as brand:brand_1=20. The search application 110 may also return an indication of non-relevant facet topics to display. These additional facet topics are determined based on an analysis of the trie of FIG. 16. More particularly, the trie of FIG. 16 is analyzed to determine that the selection of the facet "brand" matches paths to the end facets "discount," "processor_speed" and "data_transfer". If the facet interface is configured with all the facet topics for the non-faceted search result (even if some are not displayed), the search application 110 may return an indication of which additional facets to display (e.g., "discount," "processor_speed" and "data_transfer" and the user interface can populate the facet topics in the facet interface accordingly. As another example, search application 110 may return a list of facet topics to display based on the matched paths (e.g., discount:five_percent, discount:ten_percent; discount:15_percent; processor_speed:1-1.49 GHz; processor_speed:1.5-1.99 GHz; processor_speed:2-2.4 GHz; processor_speed:2.5+; data_transfer:4G; data_transfer:3G; data_transfer:Edge).

The search results display 2004 is updated to display the results associated with brand_1 and the facet interface 2002 is updated to display the facet topics represented in the search result (e.g., to display facet topic 2110). Sibling facet topics and descendent facet topics of the relevant facet topic may also be displayed. Further, facet interface 2002 is updated to display facet topics that are neither siblings nor descendants (nor ancestors) of the selected facet topic.

According to one embodiment, these additional facet topics are displayed based on the analysis of the trie of FIG. 16.

Figures 20, 21, 22:
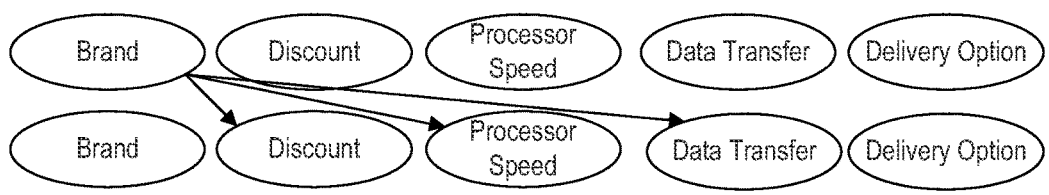
FIG. 20 is a diagrammatic representation of another embodiment of a facet configuration interface.
FIG. 21 is a diagrammatic representation of one embodiment of a facet configuration interface to define likeliness relationships.
FIG. 22 is a diagrammatic representation of one embodiment of a likeliness data structure.

FIG. 20 illustrates another embodiment of a facet configuration user interface 2122 presented to a user, similar to the interface of FIG. 14; but in this example, the user has defined a parent-child relationship between brand and discount.

FIG. 21 illustrates one embodiment of a second facet configuration interface 2122 in which the configuration user can further define likeliness relationships between facets.

FIG. 22 illustrates one embodiment of a trie to store likeliness relationships defined in FIG. 21. The likeliness relationship data structure represents the facets as nodes and the relationships as paths between the nodes.

According to one embodiment, search application 110 uses the likeliness data structure to determine which facet topics should be displayed with a faceted search result and to provide an indication to the search client. In another embodiment, the likeliness data structure can be provided to the search client and the search client can determine which facet topics to expose for display in conjunction with a faceted search result.

Figure 23:
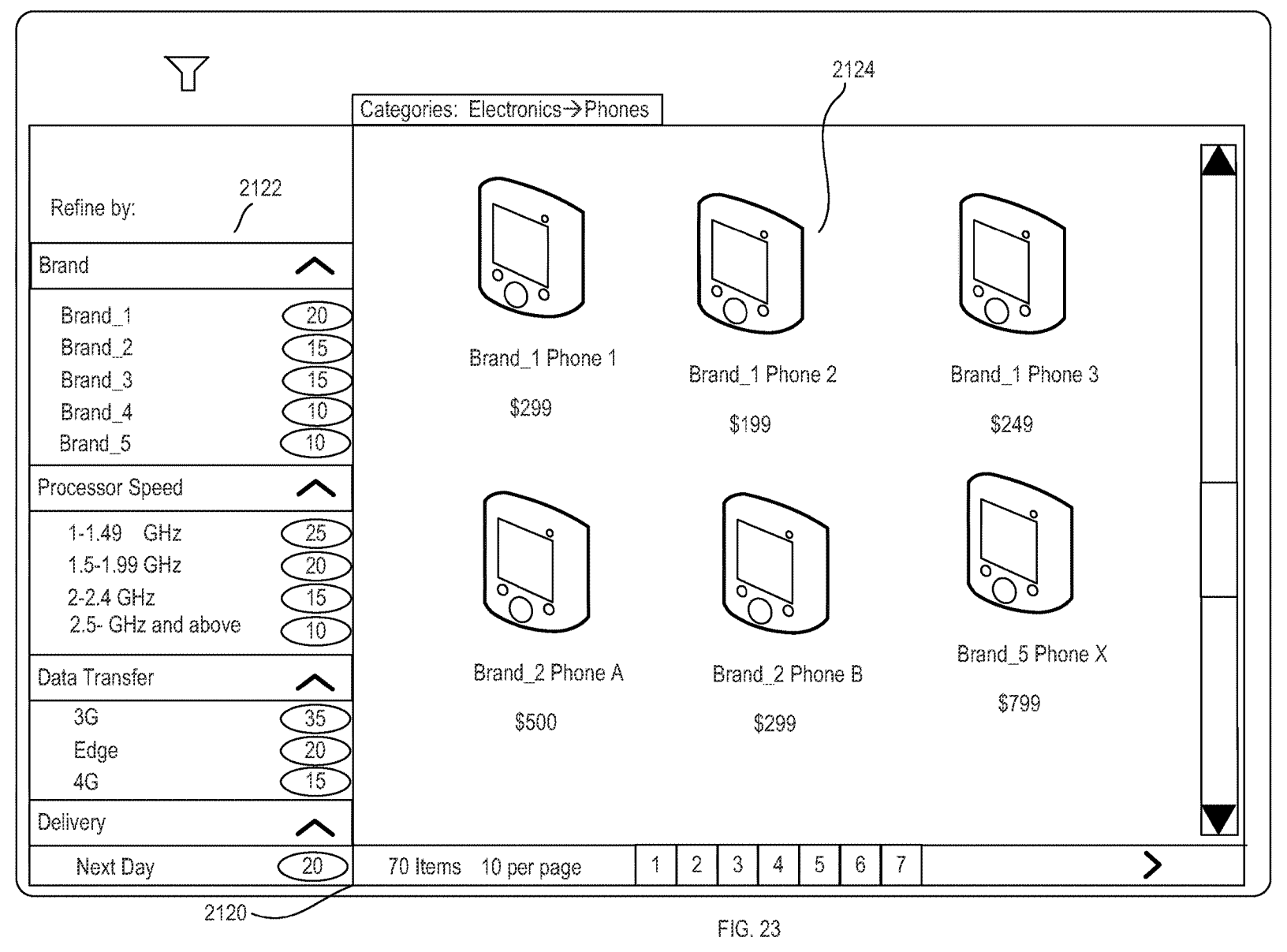

FIG. 23 is a diagrammatic representation of one embodiment of a search user interface 2120 (e.g., a search results page) presented to a search user. In the example of FIG. 23, search user interface 2120 includes a results interface 2124 configured to display results for a non-faceted "phones" search. The search results to the non-faceted "phones" search can be an example of set of search results 160 in FIG. 1. The search user interface 2120 also includes a facet configuration interface 2122 configured to display a set of facets represented by the non-faceted search result. Facet configuration interface 2122 may be a facet hierarchy interface that provides a representation of a facet hierarchy determined according to the facet hierarchy definition provided in FIG. 20.

Figure 24:
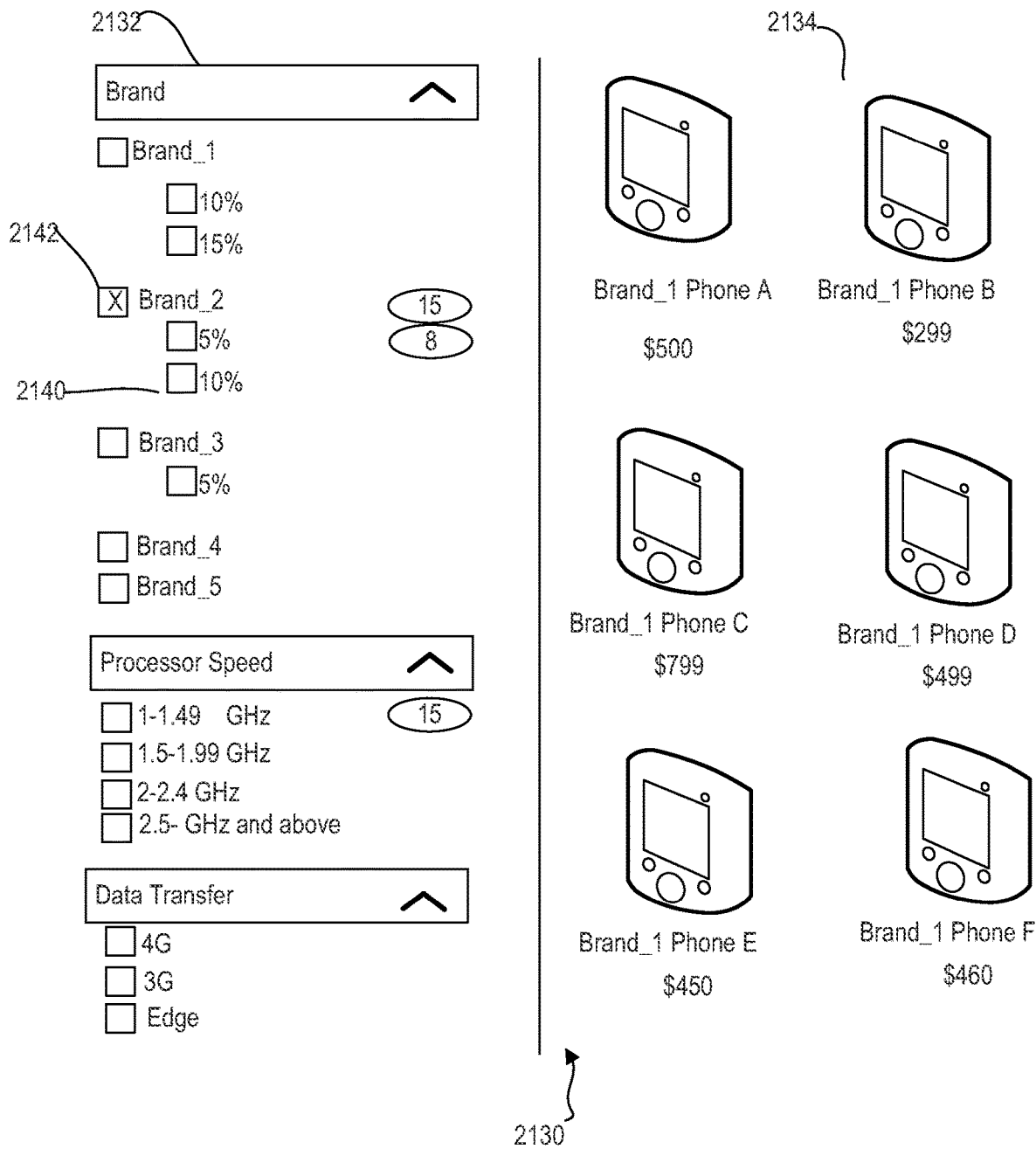
FIG. 24 is a diagrammatic representation of one embodiment of an updated search user interface displaying example faceted search results and one embodiment of an updated facet hierarchy interface.

FIG. 24 is a diagrammatic representation of one embodiment of an updated search user interface 2130 in which the user has selected the facet topic brand:brand_2. Based on the user selection of brand:brand_2, the search application 110 may return a set of faceted search results and a facet topic (node) count, such as brand:brand_2=15; brand:brand_2, discount:five_percent=8; processor_speed:1-1.49 GHz. The search results display 2134 is updated to display the relevant results associated with brand_1 and the facet hierarchy interface 2132 is updated to display child facet topic discount:five_percent and processor_speed:1-1.49 GHz, along with associated counts. In addition the facet hierarchy interface 2132 is updated to display the sibling facet topics of the selected facet topic (e.g., to display brand:brand_1, brand: brand_3, brand:brand_4, brand:brand_5). Search child facet topic brand:brand_2, discount ten_percent (e.g., child facet topic 2140) may be displayed based on its hierarchical relationship with facet topic 2142 based on its hierarchical relationship with facet topic 2142 or based on the likeliness data structure, depending on implementation.

Further, facet hierarchy interface 2132 is updated to display search facet topics, including search facet topics that are neither siblings nor descendants (nor ancestors) of the selected facet topic. According to one embodiment, these additional facet topics are displayed based on an analysis of the trie of FIG. 22. More particularly, based on the user selection of brand:brand_2, the trie of FIG. 22 is analyzed to determine that the selection of the facet "brand" matches paths to the end facets "discount," "processor_speed" and "data_transfer". If the facet interface is configured with all the facet topics for the non-faceted search result (even if some are not displayed), the search application 110 may return an indication of which additional facets to display (e.g., "discount," "processor_speed" and "data_transfer" and the user interface can populate the facet topics in the facet interface accordingly. As another example, search application 110 may return a list of facet topics to display based on the matched paths (e.g., brand:brand_1,discount: ten_percent, brand:brand_1:discount:15_percent . . . processor_speed:1.5-1.99 GHz and so on). The additional facet topics can be displayed according to the facet hierarchy.

Thus, additional facet topics may be displayed in the updated facet hierarchy based on the trie, even if the facet topics are not represented in the current faceted search results.

Figure 25:
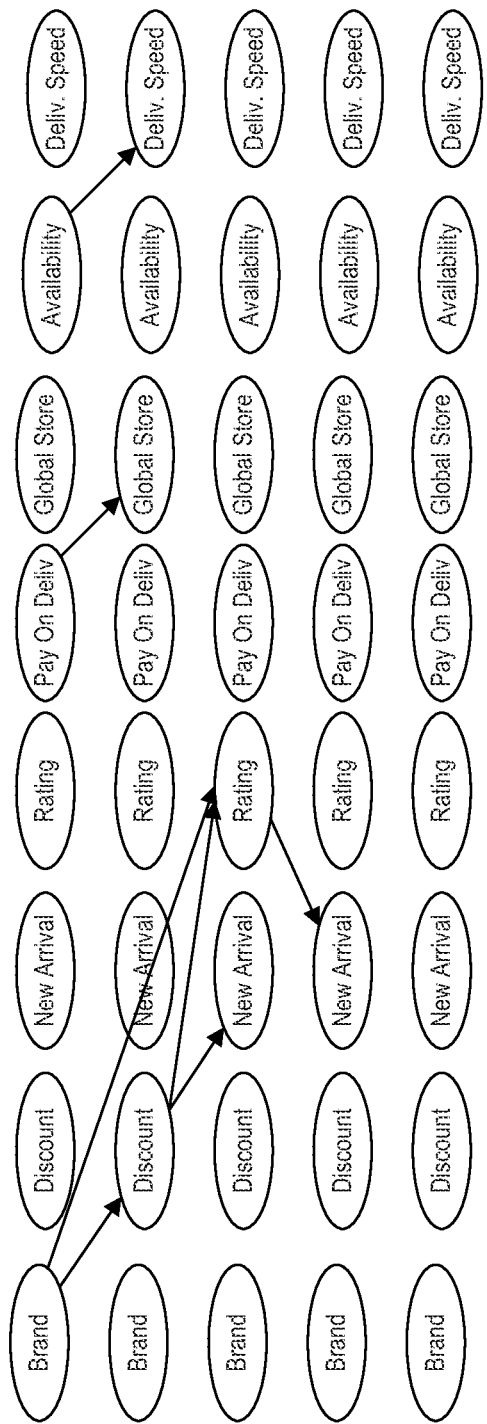
FIG. 25 is a diagrammatic representation of one embodiment of a likeliness data structure.

In the above examples of FIG. 16 and FIG. 22, the paths defined in the likeliness structures included a start facet and an end facet, but no intermediate facets. FIG. 25 illustrates a more complex example of a facet likeliness structure using additional facets. In this example, the following likeliness relationships are defined brand→discount; brand→rating; brand→discount→new arrival; brand→discount→rating; brand→discount→rating→new arrival; pay_on_deliv→global_store; availability→delivery_speed.

Using the example of FIG. 25, if a search user selects a brand facet topic for a faceted search, the facet hierarchy interface can be configured to display the brand facet topics and children facet topics in conjunction with the faceted search result. Further, the facet hierarchy interface can be updated according to the trie and facet hierarchy to show the facet topics for the discount facet and ratings facet, even if the faceted search results do not contain results associated with the discount facet topics or rating facet topics.

Now say the search user selects facet topics for the brand, discount and rating facets. In this example, the facet hierarchy interface can be configured to display the brand, discount and rating facet topics and children facet topics in conjunction with the faceted search result. Further the trie can be analyzed to determine that the selections match the path brand→discount→rating→new arrival, and the facet hierarchy interface can be updated accordingly to display the new arrival facet topics in conjunction with the faceted search results.

Figure 26:
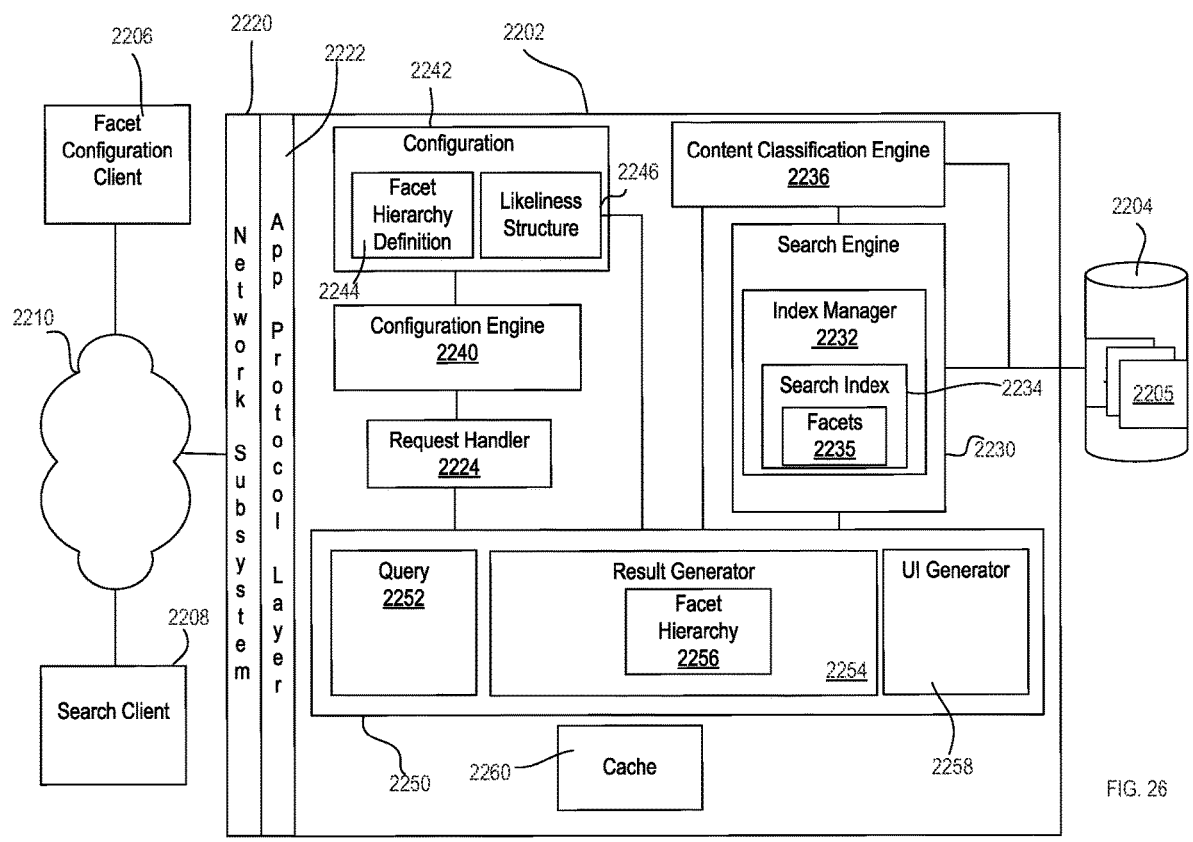
FIG. 26 is a diagrammatic representation of one embodiment of a multifaceted search system.

FIG. 26 is a functional block diagram of one embodiment of a multifaceted search system 2202, which may be one embodiment of search system 102. Search system 2202 is bi-directionally coupled to a facet configuration client system 2206 and a search client system 2208 by a network 2210. Network 2210 may comprise any suitable network such as a WAN, the Internet, LAN, a wired network, a wireless network, or a combination thereof. Search system 2202, facet configuration client system 2206 and search client system 2208 can include processors, memories, network interfaces and other components.

Search system 2202 may include a search engine 2230, a content classification engine 2236, and a search application comprising a request handler 2224, a facet configuration engine 2240 and a search component 2250. Search system 2202, according to one embodiment, is coupled to a data store 2204, which can be configured to support a storage structure for managing and storing a searchable collection of information objects 2205, such as documents (web-pages, web page fragments, word processing documents and other documents), multi-media files, database records or other information objects. Each object 2205 can be individually identifiable. The storage structure may comprise a database, a filesystem or combination thereof or other storage structure. According to one embodiment, an information object 2205 can comprise a database record storing metadata for the object and an associated file storing content of the object.

The information objects 2205 may be classified along multiple dimensions (facets) using facet classification techniques known or developed in the art. According to one embodiment, the facets are independent attributes used to classify objects 2205. The classifications (facet topics) associated with an information object 2205 may be derived from analysis of the objects 2205 using entity extraction or from analysis of fields in a data record storing attributes of the object 2205. In some embodiments, the classifications associated with an information object 2205 may be stored as metadata attributes of the information object 2205.

Search system 2202 can be configured to receive requests to configure a search component 2250 and perform searches via a network subsystem 2220 and an application protocol layer 2222 (e.g., HTTP layer or other higher protocol layer, among many possible standard and proprietary protocol layers). These higher protocol layers can encode, package, and/or reformat data for sending and receiving messages over a network layer, such as Internet Protocol (IP), and/or a transport layer, such as Transmission Control Protocol (TCP) and/or User Datagram Protocol (UDP). A request handler 2224 can be configured to receive requests via an incoming message handler and to route the requests to the facet configuration engine 2240 or a search component 2250.

Search engine 2230 associated with data store 2204 can include an index manager 2232 configured to manage, e.g., create, update, remove, merge, etc., a search index 2234 pertaining to objects 2205 stored in the data store 2204. When new or updated information is received by index manager 2232, the index manager 2232 can be configured to parse the information to identify keywords and/or tokens, which can then be included in search index 2234.

Search system 2202 may include a content classification engine 2236 to perform faceted classification on objects 2205. In an embodiment, the content classification engine 2236 can be configured to parse and semantically analyze content of objects 2205 and to apply configured classification rules relating to specified categories and/or attributes. Content classification engine 2236 can be configured to include the facets 2235 and faceted classifications (facet topics) for objects 2205 in search index 2234 (represented as facets 2235).

In an embodiment, when facet configuration engine 2240 receives the request to create or update a facet configuration, it can provide a facet configuration interface to the facet configuration client system 2206 to allow the client to provide facet configuration data related to facets 2235. Example embodiments of facet configuration interfaces presented to a configuration user are illustrated in FIGS. 2, 14, 15, 20, 21. Facet configuration engine 2240 processes the facet configuration data to create or update a facet configuration 2242 stored in a memory. Facet configuration 2242 may include a facet hierarchy definition 2244. In addition, or in the alternative, facet configuration 2242 may include a likeliness data structure 2246.

When search component 2250 receives a request for a query page, search component 2250 can be configured to transmit the query page to search client system 2208 so that a search user can submit a full-text or other non-faceted search. Search user interface 300 provides an example of a query page. Query component 2252 can be configured to forward a search query received from search client system 2208 to search engine or generate a search query to search engine 2230 based on the search request received from search client system 2208.

Search component 2250 can be configured to invoke search engine 2230 to determine a set of search results that represents the information requested by the end-user. For example, the search query can be provided to search engine 2230, which can be configured to process the search query against data store 2204. In an embodiment, search engine 2230 can be configured to scan search index 2234 to locate objects 2205 that include the requested information, and return a set of results, with each result representing an object 2205 that includes the requested information. Search engine 2230 is also configured to return the facets and facet topics for each search result. For a non-faceted search, search component 2250 or search engine 2230 may cache the set of search results in cache 2260.

In an embodiment, search result generator component 2254 can be configured to determine a facet hierarchy 2256 for the set of search results according to facet hierarchy definition 2244 and associate the facet hierarchy 2256 with the set of search results (e.g., the set of search results in cache 2260). One example of a facet hierarchy is illustrated in FIGS. 4A and 4B. Search result generator component 2254 can be configured to format the search results so that they can be included in a search results section of a search user interface. Search result generator component can also be configured to determine a count of the current search results that match each node in facet hierarchy 2256.

For a faceted search, query component 2252 can forward the faceted query or generate the faceted query to search engine 2230 to be run against the set of search results cached in cache 2260. In another embodiment, query component 2252 can forward or generate the faceted query to search result generator component 2254 and search result generator component 2254 can filter cached search results based on the faceted query. Search result generator component 2254 can be configured to format the faceted search results so that they can be included in a search results section of a search user interface. Search result generator component can also be configured to determine a count of the current faceted search results that match each node in facet hierarchy 2256.

UI generator component 2258 can be configured, in an embodiment, to generate a search user interface for search client system 2208. The search user interface can include a results display section to display the search results and a facet hierarchy interface that represents the facet hierarchy 2256. Example embodiments of search user interfaces are illustrated in FIGS. 5-10, 18-19. According to one embodiment, the search user interface may be configured with the entire facet hierarchy 2256 and to selectively show facet topics based on user facet topic selections and information provided by search component 2250.

Those skilled in the relevant art will appreciate that embodiments of the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. Embodiments discussed herein can be implemented in suitable instructions that may reside on a computer-readable medium, hardware circuitry or the like, or any combination and that may be translatable by one or more processors.

Figure 27:
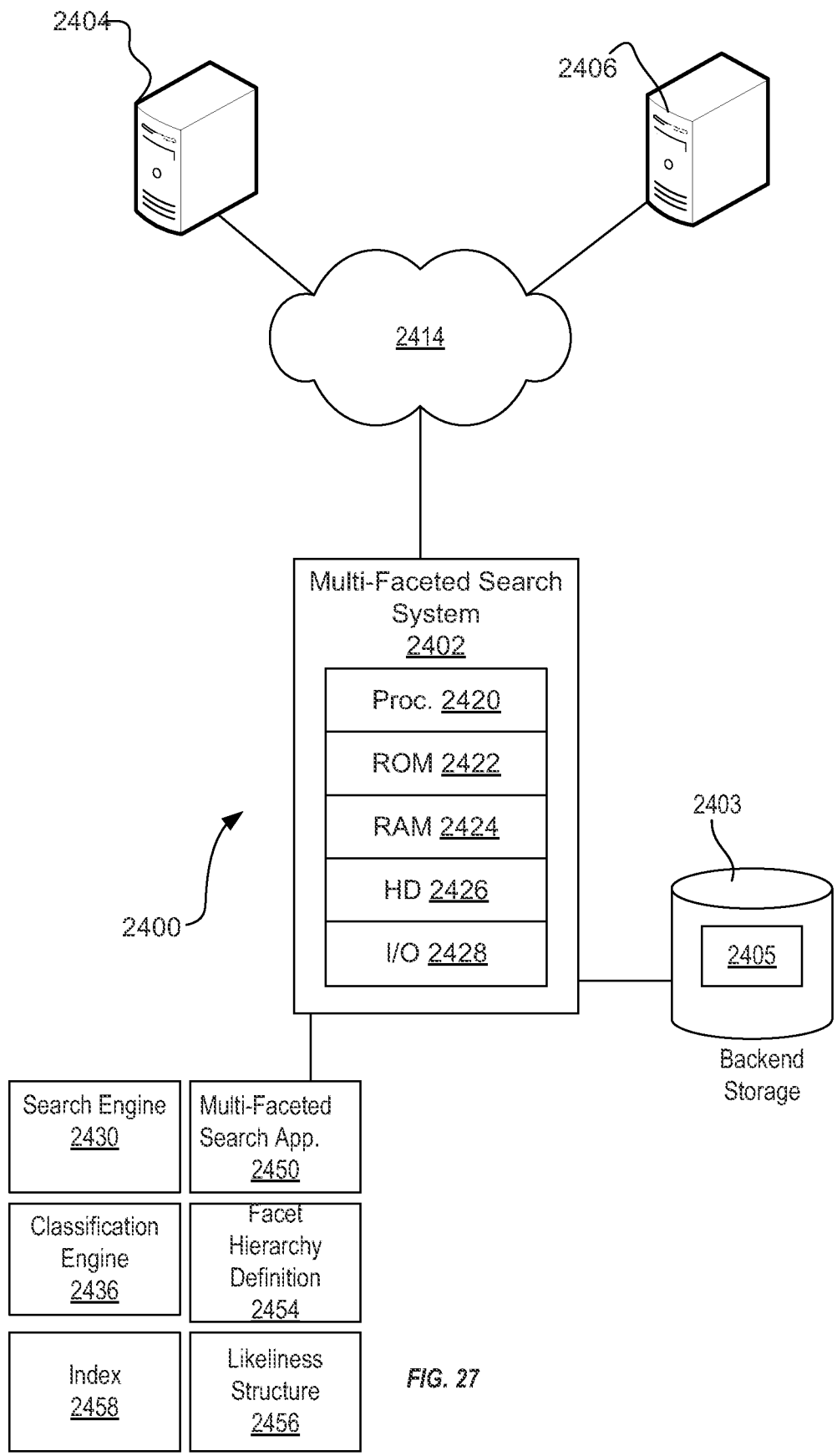
FIG. 27 is a diagrammatic representation of a network architecture.

FIG. 27 is a diagrammatic representation of a distributed network computing environment 2400 where embodiments disclosed can be implemented. In the example illustrated, network computing environment 2400 includes network 2414 that can be bi-directionally coupled to multifaceted search system 2402, a configuration client system 2404 and a search client system 2406. Network 2414 may represent a combination of wired and wireless networks that network computing environment 1200 may utilize for various types of network communications known to those skilled in the art. Search system 2402 can be bi-directionally coupled to a data store 2403 storing a searchable collection of objects 2405, such as documents (web-pages, web page fragments, word processing documents and other documents), multimedia files, database records or other information objects.

For the purpose of illustration, a single system is shown for search system 2402, configuration client system 2404 and a search client system 2406. However, with each of search system 2402, configuration client system 2404 and a search client system 2406 may comprise a plurality of computers (not shown) interconnected to each other over network 1214.

Multifaceted search system 2402 can include a processor 2420 (e.g., a CPU or other processor), read-only memory ("ROM") 2422, random access memory ("RAM") 2424, hard drive ("HD") or storage memory 2426, and input/output device(s) ("I/O") 2428. The I/O devices can include a keyboard, monitor, printer, electronic pointing device (such as a mouse, trackball, stylus, etc.), or the like. In various embodiments, the computer has access to at least one database over the network. Configuration client system 2404 and a search client system 2406 of FIG. 27 may each also include processors, memories, I/O and other computer components. Each search system 2402, configuration client system 2404 and a search client system 2406 of FIG. 27 may have more than one processor, ROM, RAM, HD, I/O, or other hardware components. For the sake of brevity, Search system 2402 is illustrated as having one of each of the hardware components, even if more than one is used.

Portions of the methods described herein may be implemented in suitable software code that may reside within ROM; RAM; HD or other computer-readable memory. Search system 2402, for example, may include software components to implement a search engine 2430, a classification engine 2436, and search application 2450. The search engine 2430 manages an index 2458. The search application 2450 may manage a facet hierarchy definition 2454 and likeliness structure 2456. Configuration client system 2404 can include software instructions to present a configuration user interface to a user and search client system 2406 can include software instructions to present a search user interface to a user. According to one embodiment, the configuration client interface and search client interface can be presented via a browser.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, or other components or mechanisms.

As discussed, processes described herein may be implemented in suitable computer-executable instructions that may reside on a computer-readable medium (e.g., ROM, RAM, and/or HD), hardware circuitry or the like, or any combination thereof. A "computer-readable medium" may be any medium that can contain a program for use by or in connection with the instruction execution system, apparatus, system or device. The computer-readable medium can be, by way of example only but not by limitation, an electronic, magnetic, optical, electromagnetic, or semiconductor system, apparatus, system, device, or computer memory. Such computer-readable medium shall generally be machine readable and include instructions.

"Computer readable medium" is not limited to ROM, RAM, and HD and can include any type of data storage medium that can be read by a processor. Examples of non-transitory computer-readable media can include, but are not limited to, a data cartridge, magnetic tape, a floppy diskette, a flash memory drive, an optical data storage drive, a CD-ROM, ROM, RAM, HD, or the like. In some embodiments, computer-executable instructions may be stored on a computer readable medium of a direct access storage device array.

A "processor" includes any hardware system, mechanism or component that processes data, signals, or other information. A processor can include a system with a central processing unit, multiple processing units, dedicated circuitry for achieving functionality, or other systems.

Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Functions of the disclosed embodiments may be implemented on one computer or shared/distributed among two or more computers in or across a network. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Communications between computers implementing embodiments can be accomplished using any electronic, optical, radio frequency signals, or other suitable methods and tools of communication in compliance with known network protocols.

Any suitable programming language can be used to implement the routines, methods or programs of embodiments of the invention described herein. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). Boolean logical operators are indicated by capitalization (e.g., AND, OR).

As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A computer-implemented method for faceted search, the method comprising:
   defining a facet structure comprising facets and relationships between the facets;
   defining a likeliness structure comprising the facets and likeliness relationships between the facets, the likeliness relationships between the facets identifying the likeliness of interest between and among facets;

receiving search results from an initial search of the facet structure, the initial search based on interest in one or more of the facets in the facet structure;

generating a search interface comprising a display of the search results;

generating a facet interface comprising a display of the facet structure based on the search results from the initial search, the display of the facet structure comprising a first facet;

based on the likeliness structure, identifying a second facet of likely interest to the first facet and not included in the search results; and modifying the display of the facet structure to further display the second facet of likely interest.

2. The method of claim 1, further comprising:

displaying the second facet of likely interest adjacent to the first facet.

3. The method of claim 1, further comprising:

defining a path comprising a plurality of facets starting from the first facet in the likeliness structure and ending at the second facet of likely interest in the likeliness structure;

wherein identifying the second facet of likely interest to the first facet and not included in the search results comprises:

traversing the path to identify the second facet of likely interest.

4. The method of claim 3, wherein the second facet of likely interest comprises a plurality of second facets of likely interest and the path comprises a plurality of paths from the first facet in the likeliness structure to at least one of the plurality of second facets of likely interest;

wherein modifying the display of the facet structure to further display the second facet of likely interest comprises:

displaying each of the plurality of second facets of likely interest adjacent to the first facet.

5. The method of claim 4, further comprising:

defining a subsequent search based on a received selection comprising the first facet and at least one of the second facets of likely interest.

6. The method of claim 1, further comprising:

defining a subsequent search based on a received selection of at least one of the facets in the facet structure.

7. The method of claim 1, wherein the facet structure comprises a hierarchy and the display of the facet structure is organized according to the hierarchy.

8. A faceted search system comprising:

a processor; and a non-transitory memory coupled to the processor and comprising instructions executable by the processor for:

defining a facet structure comprising facets and relationships between the facets;

defining a likeliness structure comprising the facets and likeliness relationships between the facets, the likeliness relationships between the facets identifying the likeliness of interest between and among the facets;

receiving search results from an initial search of the facet structure, the initial search based on interest in one or more of the facets in the facet structure;

generating a search interface comprising a display of the search results;

generating a facet interface comprising a display of the facet structure based on the search results from the initial search, the display of the facet structure comprising a first facet;

based on the likeliness structure, identifying a second facet of likely interest to the first facet and not included in the search results; and modifying the display of the facet structure to further display the second facet of likely interest.

9. The system of claim 8, the instructions further comprising:

displaying the second facet of likely interest adjacent to the first facet.

10. The system of claim 8, the instructions further comprising:

defining a path comprising a plurality of facets starting from the first facet in the likeliness structure and ending at the second facet of likely interest in the likeliness structure;

wherein identifying the second facet of likely interest to the first facet and not included in the search results comprises:

traversing the path to identify the second facet of likely interest.

11. The system of claim 10, wherein the second facet of likely interest comprises a plurality of second facets of likely interest and the path comprises a plurality of paths from the first facet in the likeliness structure to at least one of the plurality of second facets of likely interest;

wherein modifying the display of the facet structure to further display the second facet of likely interest comprises:

displaying each of the plurality of second facets of likely interest adjacent to the first facet.

12. The system of claim 11, the instructions further comprising:

defining a subsequent search based on a received selection comprising the first facet and at least one of the second facets of likely interest.

13. The system of claim 8, the instructions further comprising:

defining a subsequent search based on a received selection of at least one of the facets in the facet structure.

14. The system of claim 8, wherein the facet structure comprises a hierarchy and the display of the facet structure is organized according to the hierarchy.

15. A computer program product for faceted search, the computer program product stored in a non-transitory computer readable medium and comprising instructions for:

defining a facet structure comprising facets and relationships between the facets;

defining a likeliness structure comprising the facets and likeliness relationships between the facets, the likeliness relationships between the facets identifying the likeliness of interest between and among the facets;

receiving search results from an initial search of the facet structure, the initial search based on interest in one or more of the facets in the facet structure;

generating a search interface comprising a display of the search results;

generating a facet interface comprising a display of the facet structure based on the search results from the initial search, the display of the facet structure comprising a first facet;

based on the likeliness structure, identifying a second facet of likely interest to the first facet and not included in the search results; and modifying the display of the facet structure to further display the second facet of likely interest.

16. The computer program product of claim 15, the instructions further comprising:
displaying the second facet of likely interest adjacent to the first facet.

17. The computer program product of claim 16, the instructions further comprising:
defining a path comprising a plurality of facets starting from the first facet in the likeliness structure and ending at the second facet of likely interest in the likeliness structure;
wherein identifying the second facet of likely interest to the first facet and not included in the search results comprises:
traversing the path to identify the second facet of likely interest.

18. The computer program product of claim 17, wherein the second facet of likely interest comprises a plurality of second facets of likely interest and the path comprises a plurality of paths from the first facet in the likeliness structure to at least one of the plurality of second facets of likely interest;
wherein modifying the display of the facet structure to further display the second facet of likely interest comprises:
displaying each of the plurality of second facets of likely interest adjacent to the first facet.

19. The computer program product of claim 18, the instructions further comprising:
defining a subsequent search based on a received selection comprising the first facet and at least one of the second facets of likely interest.

20. The computer program product of claim 15, the instructions further comprising:
defining a subsequent search based on a received selection of at least one of the facets in the facet structure.

* * * * *